United States Patent
Yoshida et al.

(10) Patent No.: US 9,659,201 B2
(45) Date of Patent: May 23, 2017

(54) INFORMATION CODE, INFORMATION CODE PRODUCING METHOD, INFORMATION CODE READER, AND SYSTEM WHICH USES INFORMATION CODE

(71) Applicant: DENSO WAVE INCORPORATED, Chita-gun, Aichi-pref. (JP)

(72) Inventors: Kenichi Yoshida, Obu (JP); Masami Tanaka, Handa (JP); Takuya Yoda, Obu (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 14/654,153

(22) PCT Filed: Dec. 18, 2013

(86) PCT No.: PCT/JP2013/083913
§ 371 (c)(1),
(2) Date: Oct. 6, 2015

(87) PCT Pub. No.: WO2014/098134
PCT Pub. Date: Jun. 26, 2014

(65) Prior Publication Data
US 2016/0019407 A1    Jan. 21, 2016

(30) Foreign Application Priority Data

Dec. 19, 2012  (JP) .................................. 2012-276910
Sep. 20, 2013  (JP) .................................. 2013-196257
Nov. 19, 2013  (JP) .................................. 2013-239398

(51) Int. Cl.
G06K 5/00       (2006.01)
G06K 7/14       (2006.01)
G06K 19/06      (2006.01)

(52) U.S. Cl.
CPC ......... *G06K 7/1417* (2013.01); *G06K 7/1443* (2013.01); *G06K 7/1447* (2013.01);
(Continued)

(58) Field of Classification Search
CPC ........... G06K 19/06037; G06K 7/1417; G06K 19/06103; G06K 19/06112;
(Continued)

(56) References Cited

U.S. PATENT DOCUMENTS

2006/0097062 A1*  5/2006  Cheong ............ G06K 19/06037
                                                         235/494
2006/0274942 A1* 12/2006  Ihara ........................ G06K 7/14
                                                         382/181
(Continued)

FOREIGN PATENT DOCUMENTS

JP    2004-206674 A    7/2004
JP    2007-241327 A    9/2007
(Continued)

OTHER PUBLICATIONS

"Information technology-automatic identification and data capture techniques-QR code 2005 bar code symbology specification" International Standard ISO/IEC 18004; Second Edition; Sep. 1, 2006; Annex M; pp. 109.

(Continued)

*Primary Examiner* — Thien M Le
(74) *Attorney, Agent, or Firm* — Oliff PLC

(57) ABSTRACT

An information code producing apparatus produces a free space inside the code region of an information code arranged on a medium such as sheets of paper. The free space is arranged at a position other than specification pattern regions. Data being interpreted, which are expressed by cells, are not recorded in the free space. The free space has a preset size which is larger than that of a single cell. The
(Continued)

information code producing apparatus detects the size of this free space by, at least, either selection from a plurality of candidate shapes prepared in advance or input of shape designating information provided from the outside.

20 Claims, 36 Drawing Sheets

(52) U.S. Cl.
CPC ......... *G06K 7/1456* (2013.01); *G06K 7/1473* (2013.01); *G06K 19/06037* (2013.01); *G06K 19/06075* (2013.01); *G06K 19/06103* (2013.01)

(58) Field of Classification Search
CPC .... G06K 19/0614; G06K 7/1443; G06K 9/18; G06K 19/06131; G06K 7/14; G06K 7/1408; G06K 9/00624; G06K 9/00671; G06K 9/2063; G06K 9/2081
USPC ................. 235/437, 472.01–472.03, 494
See application file for complete search history.

(56) References Cited

U.S. PATENT DOCUMENTS

| | | |
|---|---|---|
| 2007/0277150 A1 | 11/2007 | Oouchi |
| 2009/0242649 A1 | 10/2009 | Mizukoshi et al. |
| 2012/0132721 A1 | 5/2012 | Mizukoshi et al. |
| 2012/0138694 A1 | 6/2012 | Mizukoshi et al. |
| 2012/0138695 A1 | 6/2012 | Mizukoshi et al. |
| 2013/0021364 A1* | 1/2013 | Azuma ............ G06K 19/06103 345/589 |
| 2014/0119647 A1* | 5/2014 | Cheong .................... G06K 9/18 382/166 |
| 2014/0306019 A1* | 10/2014 | Windmueller .... G06F 17/30725 235/494 |
| 2014/0326793 A1* | 11/2014 | Windmueller ... G06K 19/06037 235/494 |
| 2015/0146925 A1* | 5/2015 | Son .................... G06K 9/00624 382/103 |

FOREIGN PATENT DOCUMENTS

| | | |
|---|---|---|
| JP | 2008-152334 A | 7/2008 |
| JP | 2009-129410 A | 6/2009 |
| JP | 2009-259192 A | 11/2009 |
| JP | 5057560 B2 | 10/2012 |
| WO | 2007/107533 A2 | 9/2007 |

OTHER PUBLICATIONS

Feb. 25, 2014 International Search Report issued in International Patent Application No. PCT/JP2013/083913.

Jul. 2, 2015 International Preliminary Report on Patentability issued in International Patent Application No. PCT/JP2013/083913.

\* cited by examiner

FIG.11

| NAME | LENGTH (bit) | Canvas mode |
|---|---|---|
| MD | 0 | 0: Fix mode<br>1: Manual mode |
| CEN | 1 | 0: CENTER POS is not used.<br>1: CENTER POS is used. |
| SZ | 1 | 0: SIZE is not used.<br>1: SIZE is used. |
| ANG | 1 | 0: ANGLE is not used.<br>1: ANGLE is used. |
| MASK NO. | 4 | 0 : square<br>1 : triangle<br>2 : circle<br>3 : star<br>:<br>15: heart |
| CENTER POS | 4 | Specyfy CENTER POS coordinates. |
| SIZE | 3 | Specyfy MASK SIZE. |
| ANGLE | 2 | Specyfy ANGLE. (0 – 45 degrees) |

FIG.12

| NAME | LENGTH (bit) | Canvas mode |
|---|---|---|
| MD | 1 | 0 : Fix mode<br>1 : Manual mode |
| POIN NUM | 5 | Specfy CANVAS POLYGON. (3 – 31) |
| POS 1 | 6 | |
| POS 2 | 6 | |
| POS 3 | 6 | |
| ⋮ | ⋮ | ⋮ |
| POS 32 | 6 | |

CENTER POS COORDINATES

MD = 0
CEN = 1
SZ = 1
ANG = 1
MASK NO = 1 (triangle)
CENTER POS = 1
SIZE = 5 (6 block)
ANGLE = 2 (30 degree)

FIG.15
(A)
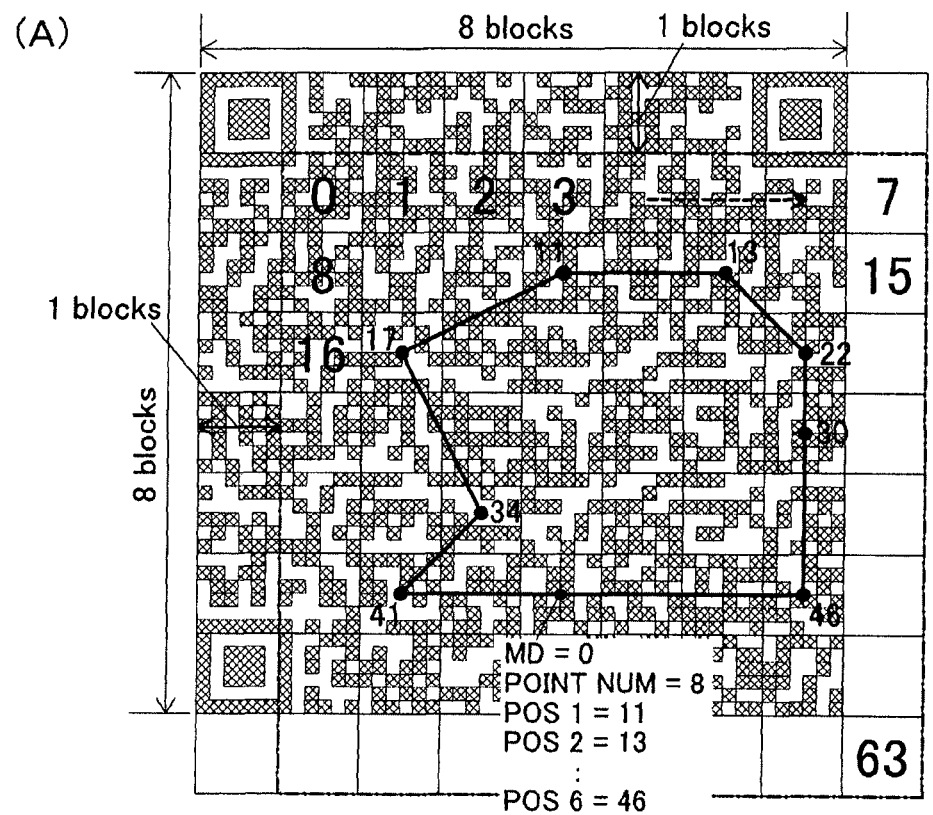
(B)
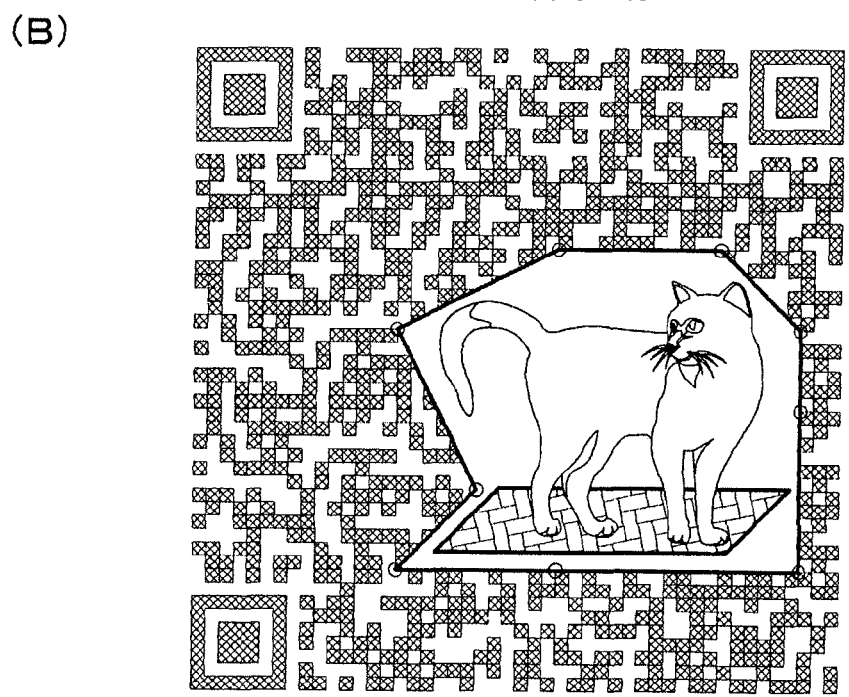

FIG.16
(A) 
(B) 
(C) 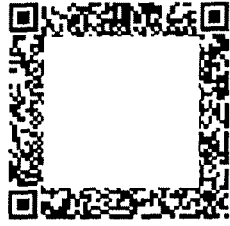
(D) 
(E) 
(F) 
(G) 
(H) 
(I) 
(J) 

FIG.17
(A) 
(B) 
(C) 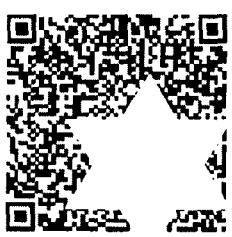
(D) 
(E) 
(F) 
(G) 
(H) 

FIG.18
(A)
(B)

FIG.19
(A)
(B)

FIG.24
(A)
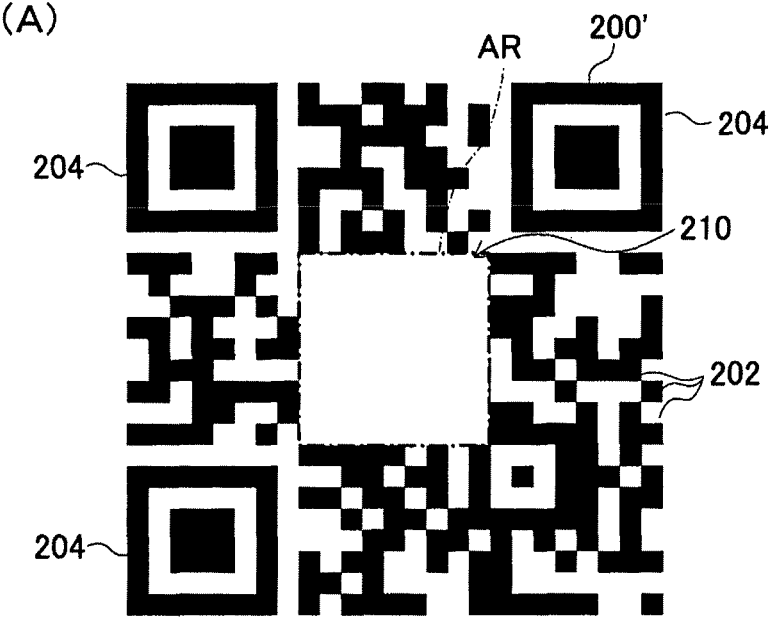
(B)
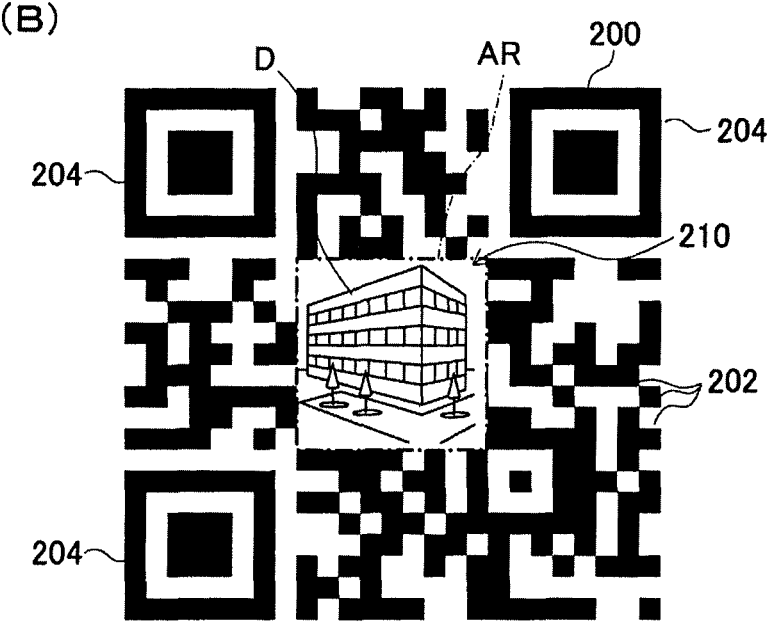

FIG.25
(A)
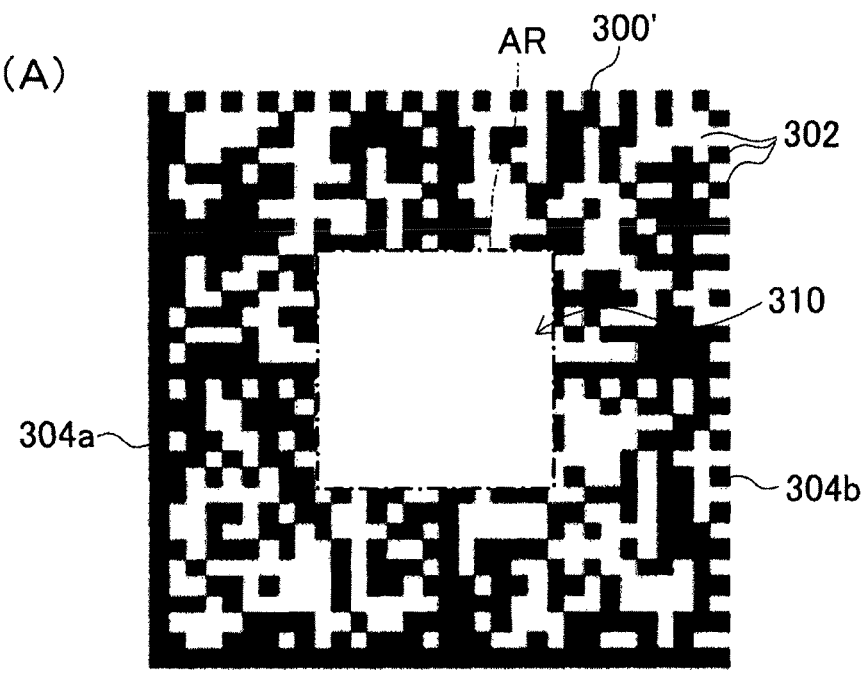
(B)
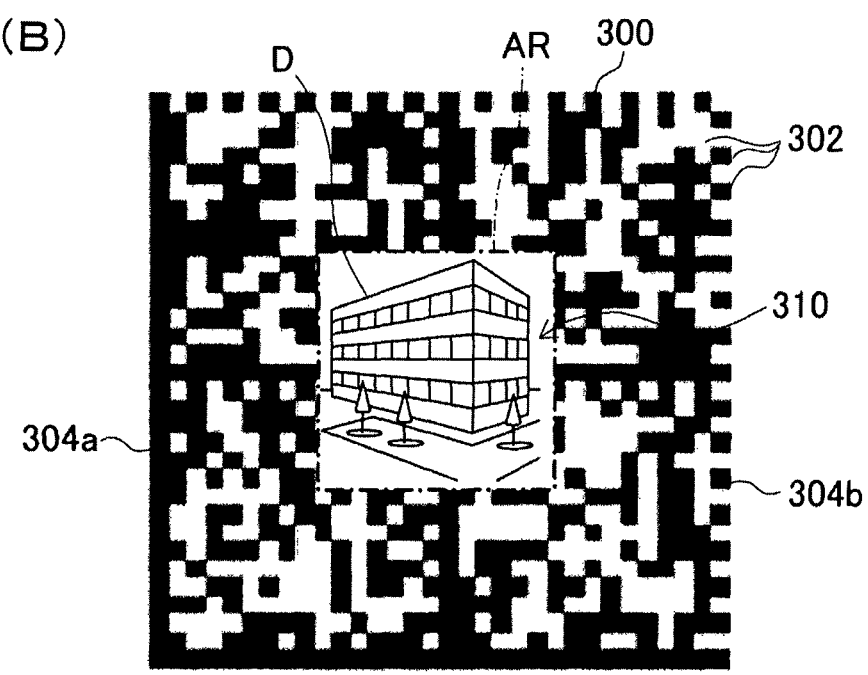

FIG.33
(A)
(B)
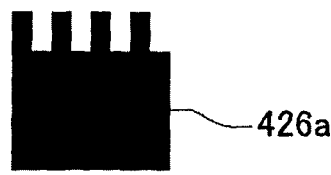

FIG.34
(A)
 00000000
(B)
 00000001
(C)
 00000010
(D)
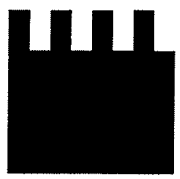 10101010

INFORMATION CODE, INFORMATION CODE PRODUCING METHOD, INFORMATION CODE READER, AND SYSTEM WHICH USES INFORMATION CODE

CROSS-REFERENCE TO RELATED APPLICATIONS

This application is based on and claims the benefit of priority from earlier Japanese Patent Applications 2012-276910 filed Dec. 19, 2012; 2013-196257 filed Sep. 20, 2013; and 2013-239398 filed Nov. 19, 2013, the descriptions of which are incorporated herein by reference in their entireties.

TECHNICAL FIELD

The present invention relates to an information code such as two-dimensional codes, a production method for producing the information code, a reader which reads the information code, and a system that uses the information code.

BACKGROUND ART

Information codes such as two-dimensional codes have now been used in many applications. Such applications include an application in which a picture or a figure is arranged in the code area. For example, a technique provided by patent literature 1 is concerned with a two-dimensional code produced by strings of reverse-converted bits which are reversely converted from strings of bits. These strings of bits form a region of the code, in which the region is composed at a single gray level. The reverse-converted bit strings are converted based on information about a format for the two-dimensional code, thus producing a unique two-dimensional code with a design region composed of the single gray level.

In the technique shown by the foregoing patent literature 1, if the unique two-dimensional code has a design region composed of white modules, given design data are combined with the unique two-dimensional code such that a design composed of gray levels which can be read as white is formed in the design region. In contrast, if the unique two-dimensional code has a design region composed of black modules, given design data are combined with the unique two-dimensional code such that a design composed of gray levels which can be read as black is formed in the design region.

CITATION LIST

Patent Literature

[PTL 1] JP Patent No. 5057560

By the way, the inventors have conceived of an information code in which a space (free space) can be arranged in the code area and data and/or designs are recorded and/or displayed in the region by using a way different from that for recording data in the data recording region. Thus, users can have an information code in which designs and/or marks can be displayed in the code region more freely. In this case, however, if the shape of the free space is limited to a single fixed one, there is caused a drawback that the free space occupies a larger portion of the code region and data which can be arranged reduces, although it is thought that more data can be recorded compared to contents being displayed in the free space. This will happen in cases, for example, the size of the free space is too big unnecessarily compared to contents displayed in the free space or there is a larger vacancy between the outer contours of both the free space and a display area in the free space.

The present invention has been made to overcome the foregoing drawback, and thus an object of the present invention is to provide a code configuration in which a region (free space) can be arranged in the code region in an arbitrary manner and data and/or designs can be recorded and/or displayed by a method different from that for recording data in the data recording region of the code.

A first aspect of the present invention relates to an information code producing method for producing information code by an information code producing apparatus, the information code having a predetermined code region of a medium in which cells are arranged, the cells being units for displaying information. The information code producing method includes providing a specification pattern region and a data recording region in the code region, a specification pattern being arranged in the specification pattern region, data being recorded in the data recording region by a plurality of types of the cells, the specification pattern having a predetermined shape and including a pattern indicating a position of the code region; providing a free space in a position other than the specification pattern region in the code region, the free space enabling at least one of recoding data and displaying designs by a method different from, a method for recording data in the data recording region, the free space having a predetermined size larger than a size of a single cell of the cells; and determining a shape of the free space by at least one of: a method for selecting a shape from a plurality of preliminarily prepared candidate shapes; and a method for setting a shape according to shape specifying information input from outside to the information code producing apparatus.

A second aspect relates to, similarly to the first aspect, an information code producing method. This information code producing method includes providing a specification pattern region and a data recording region in the code region, a specification pattern being arranged in the specification pattern region, data being recorded in the data recording region by a plurality of types of the cells, the specification pattern having a predetermined shape and including a pattern indicating a position of the code region; providing a free space in a position other than the specification pattern region in the code region, the free space enabling at least one of recoding data and displaying designs by a method different from a method for recording data in the data recording region, the free space having a predetermined size larger than a size of a single cell of the cells; and providing an identification display portion in a boundary portion of the free space or a position adjacent to the boundary portion, the identification display portion using a display method different from a display method of the cells in the data recording region.

A third aspect relates to an information code having a predetermined code region of a medium in which cells are arranged, the cells being units for displaying information. The information code includes a specification pattern region and a data recording region that are disposed in the code region, a specification pattern being arranged in the specification pattern region, data being recorded in the data recording region by a plurality of types of the cells, the specification pattern having a predetermined shape and including a pattern indicating a position of the code region; and a free space that is disposed in a position other than the specification pattern region in the code region, the free space enabling at least one of recoding data and displaying designs by a method different from a method for recording data in the data recording region, the free space having a predetermined size larger than a size of a single cell of the cells, the free space having a shape that is determined by at least one of: a method for selecting a shape from a plurality of preliminarily prepared candidate shapes; and a method for setting a shape according to shape specifying information input from outside to the information code producing apparatus.

A fourth aspect relates to an information code, similarly to the third aspect. the information code includes a specification pattern region and a data recording region that are disposed in the code region, a specification pattern being arranged in the specification pattern region, data being recorded in the data recording region by a plurality of types of the cells, the specification pattern having a predetermined shape and including a pattern indicating a position of the code region; a free space that is disposed in a position other than the specification pattern region in the code region, the free space enabling at least one of recoding data and displaying designs by a method different from a method for recording data in the data recording region, the free space having a predetermined size larger than a size of a single cell of the cells; and an identification display portion that is disposed in a boundary portion of the free space or a position adjacent to the boundary portion, the identification display portion using a display method different from a display method of the cells in the data recording region.

According to a fifth aspect, there is provided an information code reader that reads an information code having a predetermined code region of a medium in which cells are arranged, the cells being units for displaying information. The information code includes a specification pattern region and a data recording region that are disposed in the code region, a specification pattern being arranged in the specification pattern region, data being recorded in the data recording region by a plurality of types of the cells, the specification pattern having a predetermined shape and including a pattern indicating a position of the code region; and a free space that is disposed in a position other than the specification pattern region in the code region, the free space enabling at least one of recoding data and displaying designs by a method different from a method for recording data in the data recording region, the free space having a predetermined size larger than a size of a single cell of the cells. The free space has a shape that is determined by at least one of: a method for selecting a shape from a plurality of preliminarily prepared candidate shapes; and a method for setting a shape according to shape specifying information input from outside to the information code producing apparatus. The information code reader includes an imaging unit capable of imaging the information code; and an interpreting section that interprets data recorded in the data recording region when the information code is imaged by the imaging unit.

Similarly to the fifth aspect, there is provided a sixth aspect relating to an information code reader. This information code includes a specification pattern region and a data recording region that are disposed in the code region, a specification pattern being arranged in the specification pattern region, data being recorded in the data recording region by a plurality of types of the cells, the specification pattern having a predetermined shape and including a pattern indicating a position of the code region; a free space that is disposed in a position other than the specification pattern region in the code region, the free space enabling at least one of recoding data and displaying designs by a method different from a method for recording data in the data recording region, the free space having a predetermined size larger than a size of a single cell of the cells; and an identification display portion that is disposed in a boundary portion of the free space or a position adjacent to the boundary portion, the identification display portion using a display method different from a display method of the cells in the data recording region. The information code reader includes an imaging unit capable of imaging the information code; an interpreting section that interprets data recorded in the data recording region when the information code is imaged by the imaging unit; and an identification display detecting section that detects the identification display portion from an image of the information code imaged by the imaging unit.

According to a seventh aspect, there is provided a system which uses information code, the system including an information code producing apparatus that produces an information code having a predetermined code region of a medium in which cells are arranged, the cells being units for displaying information; and an information code reader that reads the information code produced by the information code producing apparatus. The information code producing apparatus producing the information code which is configured such that: a specification pattern region and a data recording region are disposed in the code region, a specification pattern being arranged in the specification pattern region, data being recorded in the data recording region by a plurality of types of the cells, the specification pattern having a predetermined shape and including a pattern indicating a position of the code region; and a free space is disposed in a position other than the specification pattern region in the code region, the free space enabling at least one of recoding data and displaying designs by a method different from a method for recording data in the data recording region, the free space having a predetermined size larger than a size of a single cell of the cells. The free space having a shape that is determined by at least one of: a method for selecting a shape from a plurality of preliminarily prepared candidate shapes; and a method for setting a shape according to shape specifying, information input from outside to the information code producing apparatus. The information code reader includes an imaging unit capable of imaging the information code; and an interpreting section that interprets data recorded in the data recording region when the information code is imaged by the imaging unit.

Similarly to the seventh aspect, there can be provided an eighth aspect. In this eighth aspect, the information code producing apparatus produces a specification pattern region and a data recording region are disposed in the code region, a specification pattern being arranged in the specification pattern region, data being recorded in the data recording region by a plurality of types of the cells, the specification pattern having a predetermined shape and including a pattern indicating a position of the code region; a free space is disposed in a position other than the specification pattern region in the code region, the free space enabling at least one of recoding data and displaying designs by a method different from a method for recording data in the data recording region, the free space having a predetermined size larger than a size of a single cell of the cells; and an identification display portion is disposed in a boundary portion of the free space or a position adjacent to the boundary portion, the identification display portion using a display method different from a display method of the cells in the data recording region. The information code reader includes an imaging unit capable of imaging the information code; an interpreting section that interprets data recorded in the data recording region when the information code is imaged by the imaging unit; and an identification display detecting section that detects the identification display portion from an image of the information code imaged by the imaging unit.

Advantageous Effects of Invention

In the foregoing first aspect, inside the code region of the medium, the free space can be arranged at a position other than the positions of the specification pattern regions. Into the free space, data can be recorded and/or designs can be displayed, by a method different from that used for recording data into the data recording region. Hence, user-friendliness can be enhanced. In particular, since the free space enables users to perform the foregoing data recording and/or the display of designs, restrictions resulting from the data recording region can be suppressed as much as possible from increasing, when the free space is configured. In addition, the shape of the free space can be given by either selecting a plurality of candidate shapes prepared in advance or setting a shape defined by shape designating information given to the information code producing apparatus from the outside. Therefore, the shape of the free space is not limited to a fixed shape, thus increasing the degree of freedom in selecting the free space shape. This means that it becomes easier to make the shape of the free space match contents displayed in the free space, finally resulting in effective data arrangements in the code.

In the foregoing second aspect, the identification display portion can be arranged in a boundary portion of the free space or a position adjacent to the boundary portion, by using a display method different from a display method of the cells into the data recording region. When reading the information code, recognizing the identification display portion makes it possible to specify the position of the free space in a more accurate manner.

The boundary portion of the free space herein referred is, for example, an edge portion located along the boundary inside the free space, and the position adjacent to the boundary portion is, for example, a portion located along the boundary in the outsider region of the free space.

In the third aspect, inside the code region of the medium, the free space can be arranged at a position other than the positions of the specification pattern regions. Into the free space, data can be recorded and/or designs can be displayed, by a method different from that used for recording data into the data recording region. Hence, user-friendliness can be enhanced. In particular, since the free space enables users to perform the foregoing data recording and/or the display of designs, restrictions resulting from the data recording region can be suppressed as much as possible from increasing, when the free space is configured. In addition, the shape of the free space can be given by either selecting a plurality of candidate shapes prepared in advance or setting a shape defined by shape designating information given to the information code producing apparatus from the outside. Therefore, the shape of the free space is not limited to a fixed shape, thus increasing the degree of freedom in selecting the free space shape. This means that it becomes easier to make the shape of the free space match contents displayed in the free space, finally resulting in effective data arrangements in the code.

In the fourth aspect, there is arranged the identification display portion at the boundary portion or a portion adjacent to the boundary portion of the free space. This identification display portion is set by a display method different from that for displaying cells in the data recording region. Hence, the reader easily recognizes the identification display portion and positionally detects the free space in a more accurate manner.

Furthermore, in the fifth aspect, the reader can read a distinguishing information code which is easier to make the free space shape match contents displayed in the free space.

In the sixth aspect, the free space can be positionally detected more accurately, because the identification-display detecting section can detects the identification display portion which is arranged as explained above.

In the seventh aspect, inside the code region of the medium, the free space can be arranged at a position other than the positions of the specification pattern regions. Into the free space, data can be recorded and/or designs can be displayed, by a method different from that used for recording data into the data recording region. Hence, user-friendliness can be enhanced. In particular, since the free space enables users to perform the foregoing data recording and/or the display of designs, restrictions resulting from the data recording region can be suppressed as much as possible from increasing, when the free space is configured. In addition, the shape of the free space can be given by either selecting a plurality of candidate shapes prepared in advance or setting a shape defined by shape designating information given to the information code producing apparatus from the outside. Therefore, the shape of the free space is not limited to a fixed shape, thus increasing the degree of freedom in selecting the free space shape. This means that it becomes easier to make the shape of the free space match contents displayed in the free space, finally resulting in effective data arrangements in the code.

In the eighth aspect, the free space can be positionally detected more accurately, because the identification-display detecting section can detects the identification display portion which is arranged as explained above.

Figure 1:
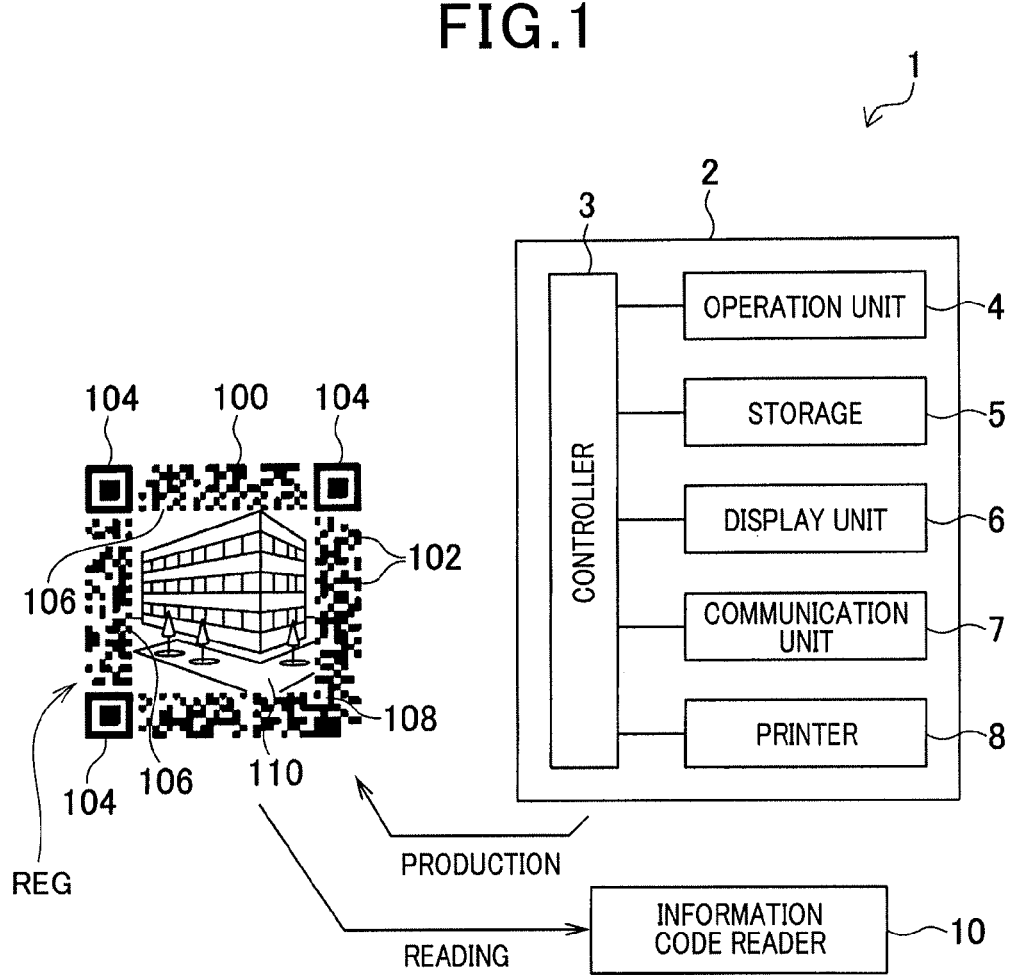
FIG. 1 is an outlined view exemplifying a system which uses an information code, according to a first embodiment of the present invention.
Figure 10:
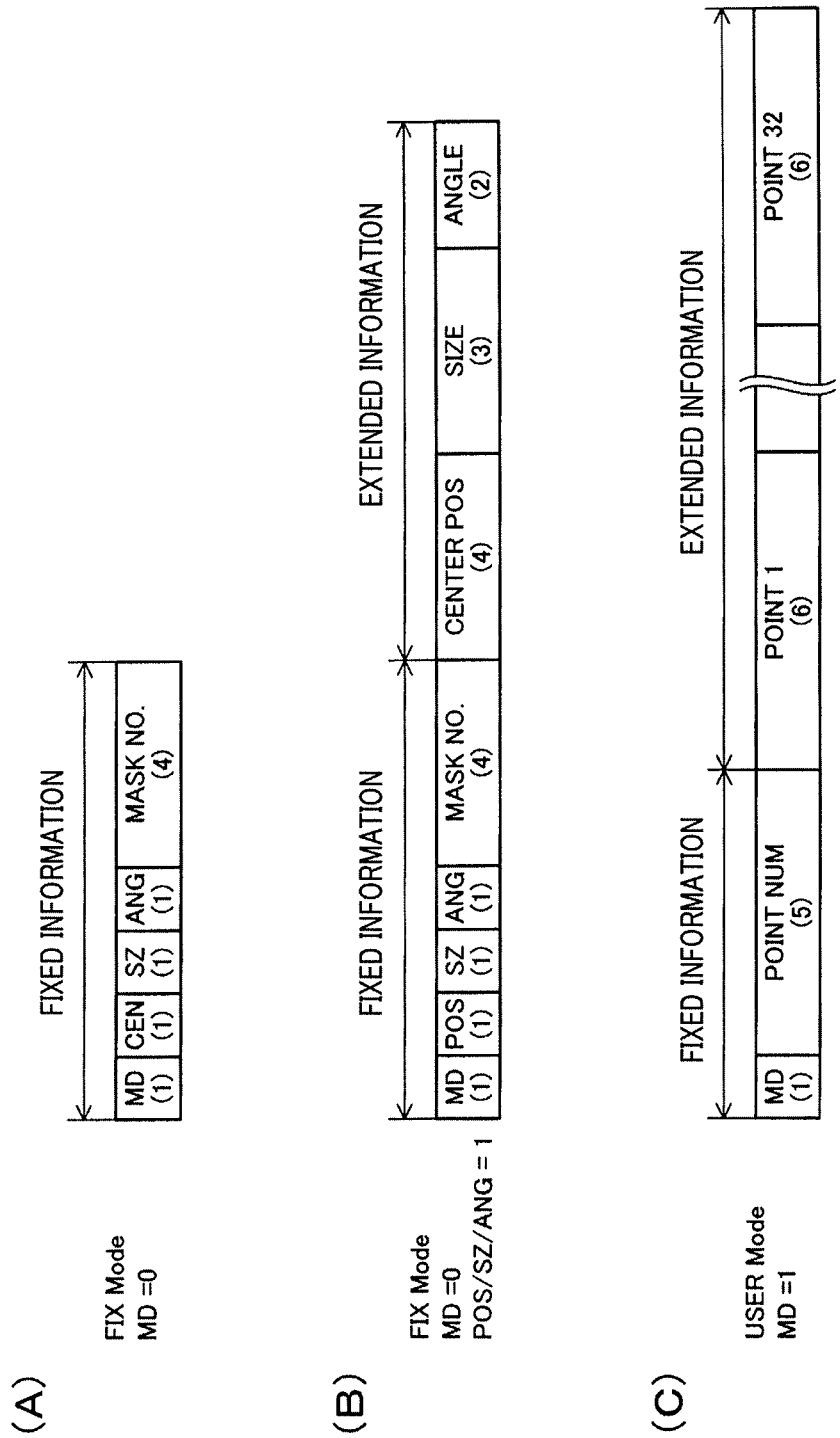
Figure 13:
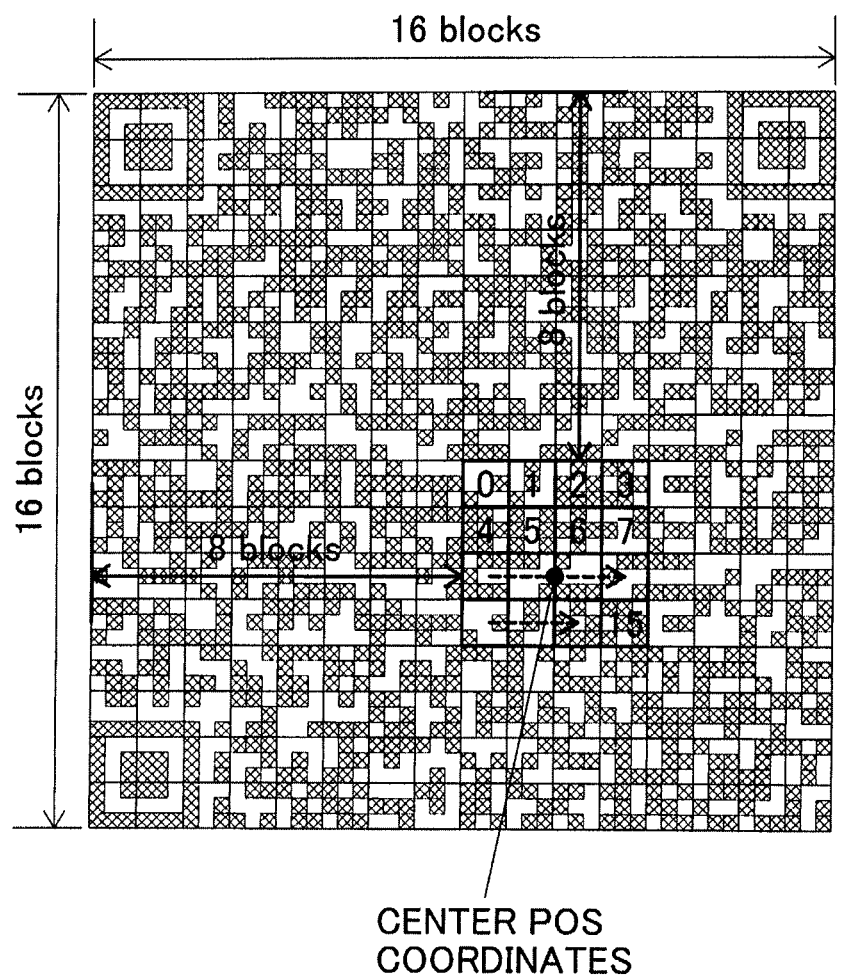
Figure 14:
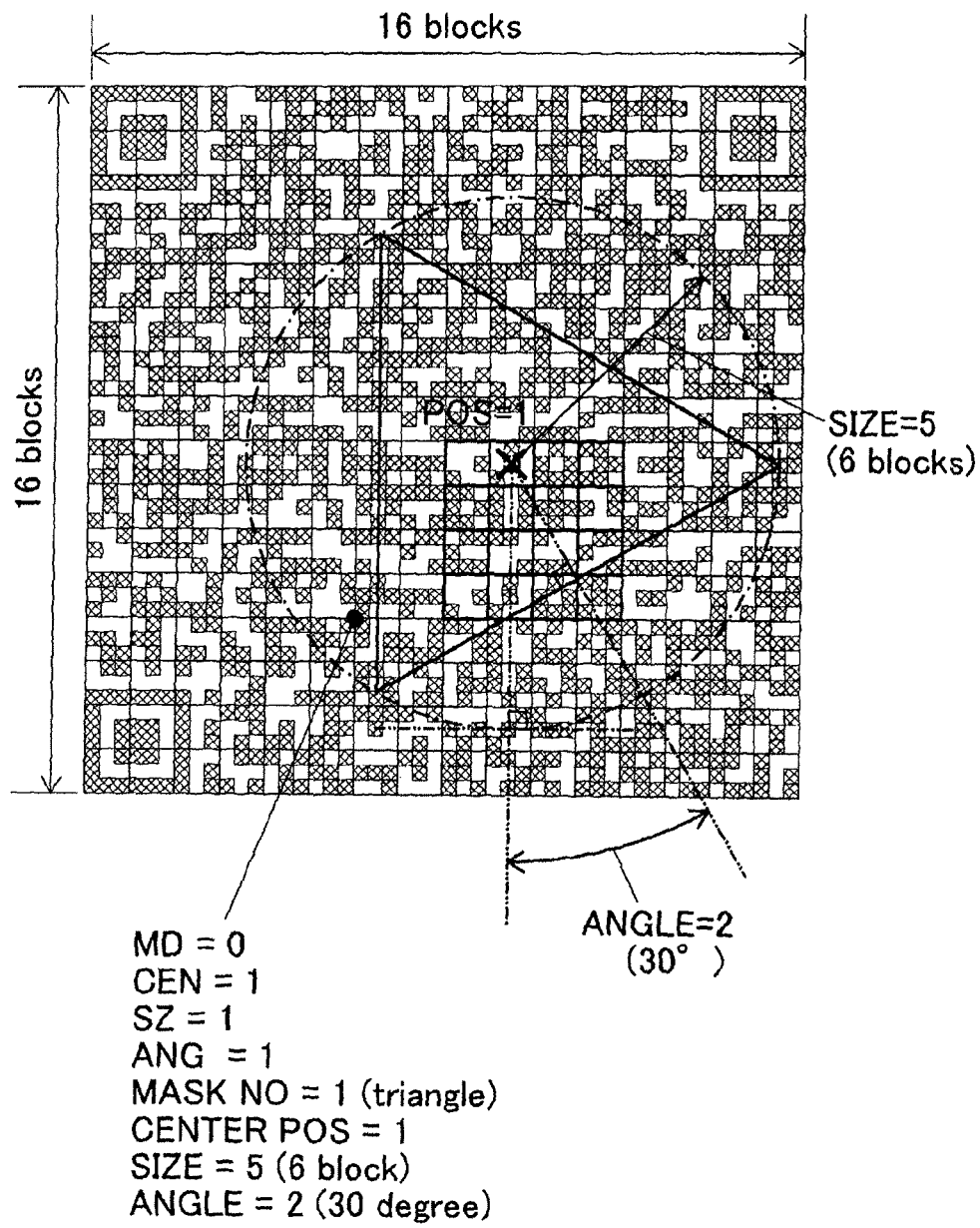

(A) of FIG. 10 is an illustration explaining the configuration of part (fixed information) of the format information in the information code used by the system shown in FIG. 1, (B) of FIG. 10 is an illustration exemplifying fixed information which is different from that shown in (A) of FIG. 10, and (C) of FIG. 10 is an illustration exemplifying fixed information which is different from that shown in (A) and (B) of FIG. 10;

FIG. 11 is an explanatory diagram that conceptually explains a configuration of position data when the specific position of a free space is specified in FIX MODE;

FIG. 12 is an explanatory diagram that conceptually explains the configuration of position data when the specific position of the free space is specified in USER MODE (manual mode);

FIG. 13 is an explanatory diagram that conceptually explains a setting area of a center position;

FIG. 14 is an explanatory diagram that conceptually explains a setting method for free space in FIX MODE.

Figure 5:
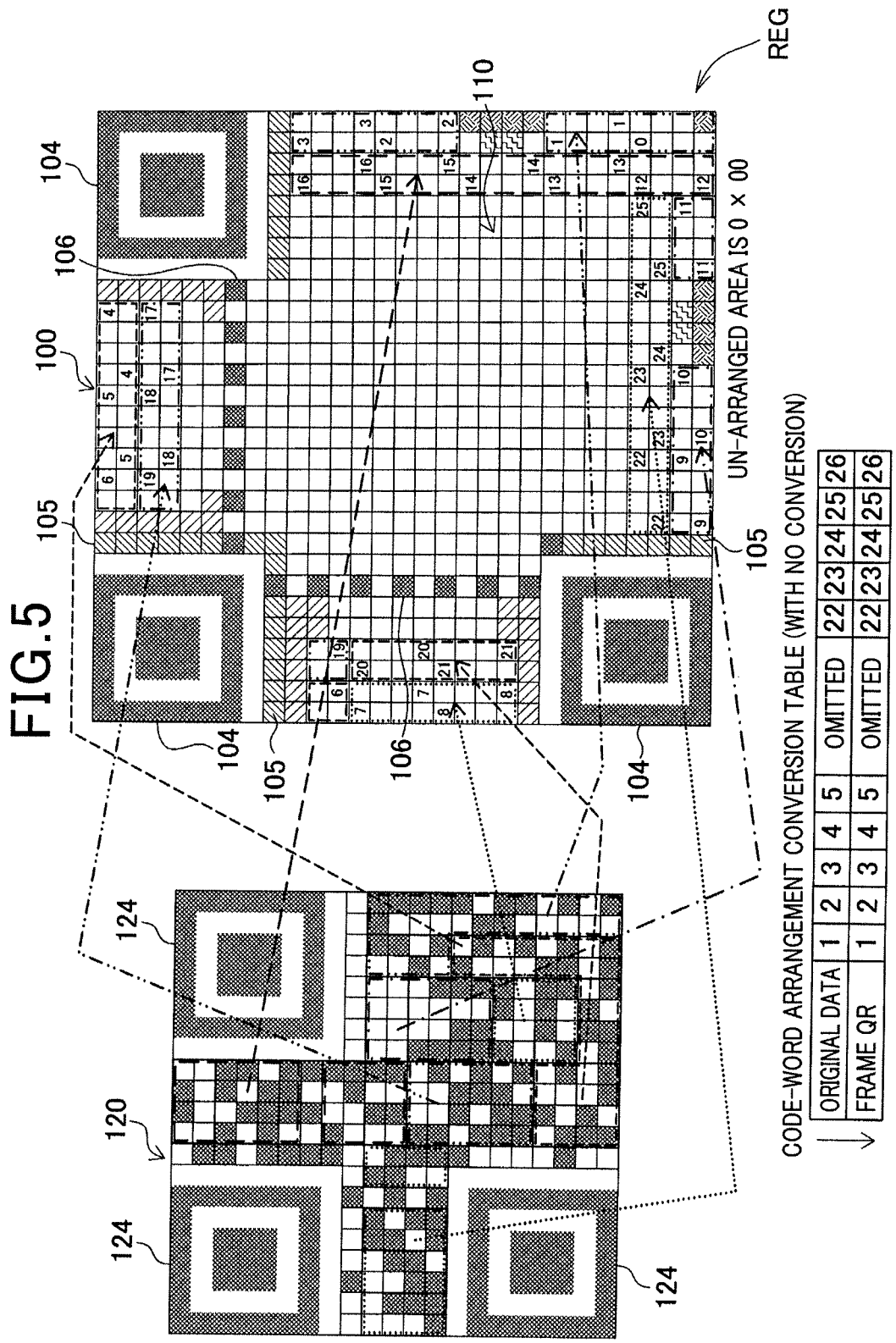
FIG. 5 is an illustration explaining a correspondence relationship between arrangements of respective data words in the information code produced by an information code producing apparatus composing part of the system shown in FIG. 1 and arrangements of respective code words in another type of code.
Figure 20:
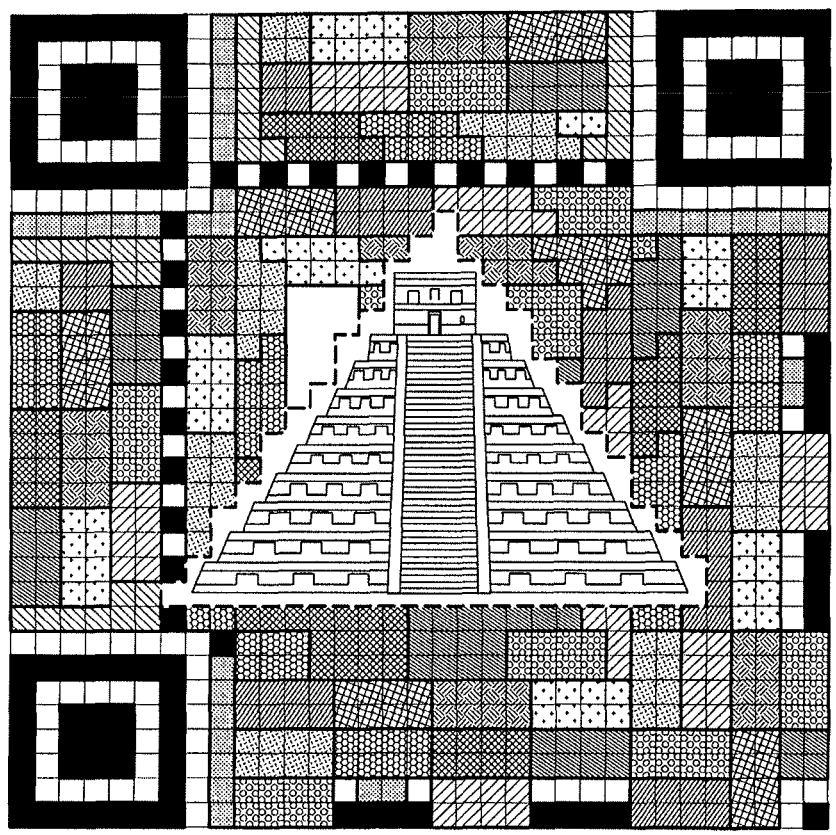
Figure 21:
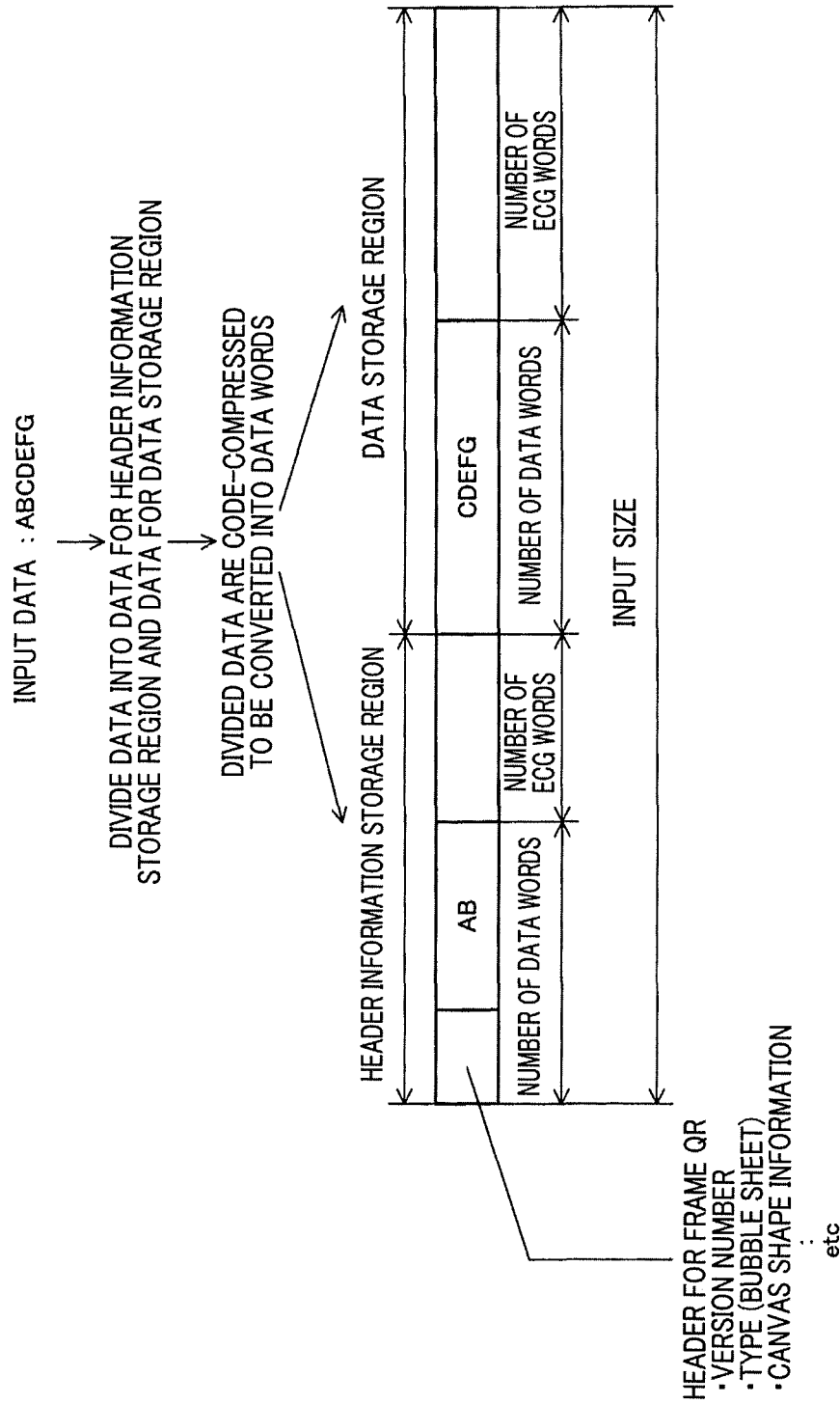
Figure 22:
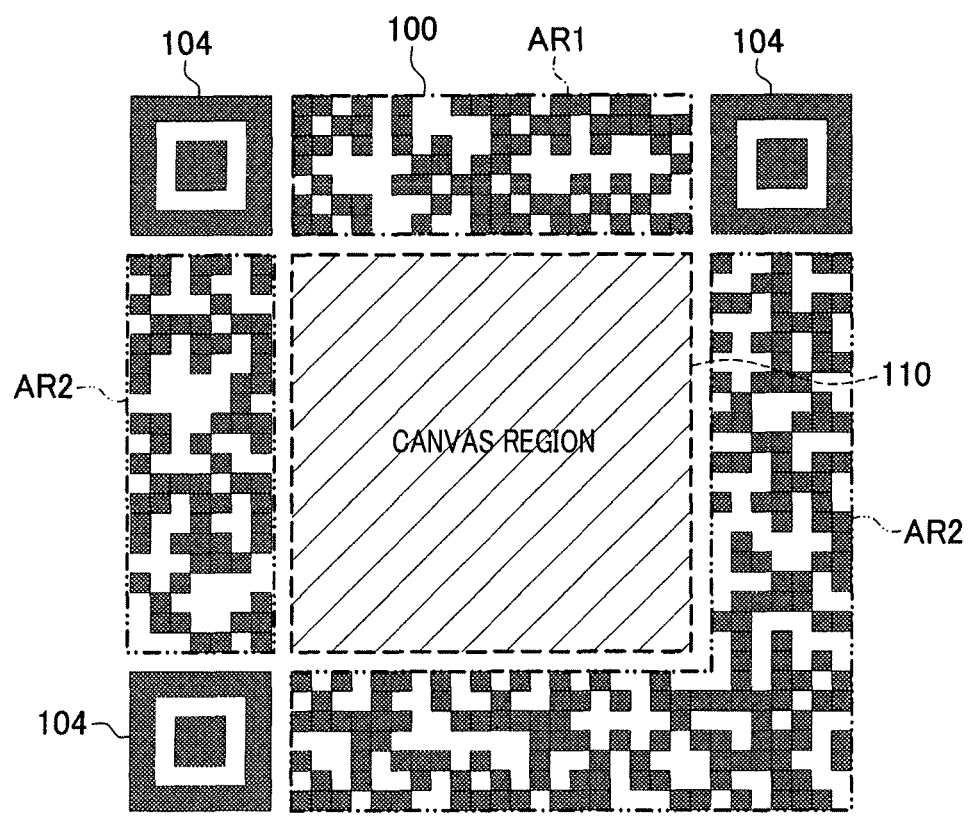
Figure 23:
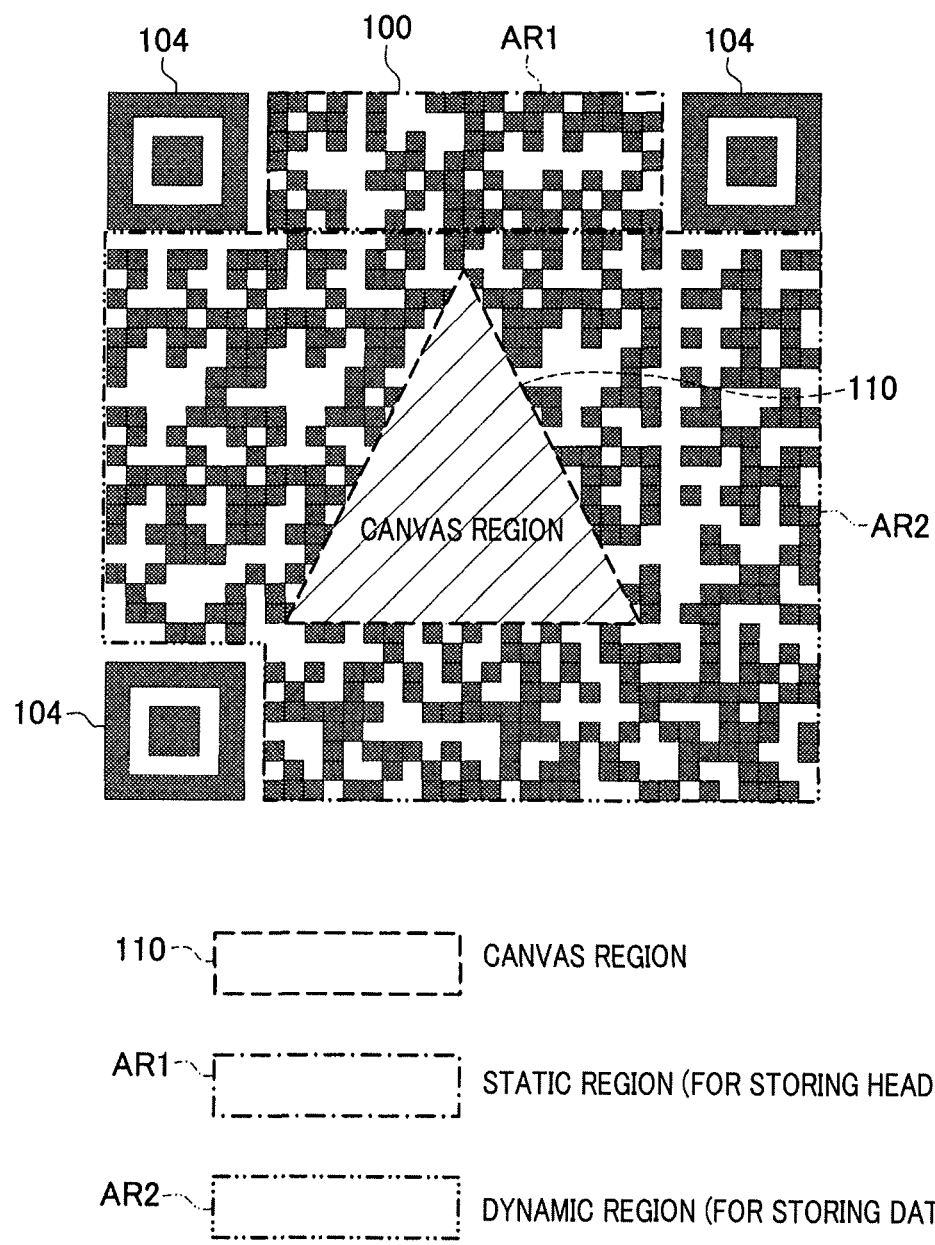
Figure 26:
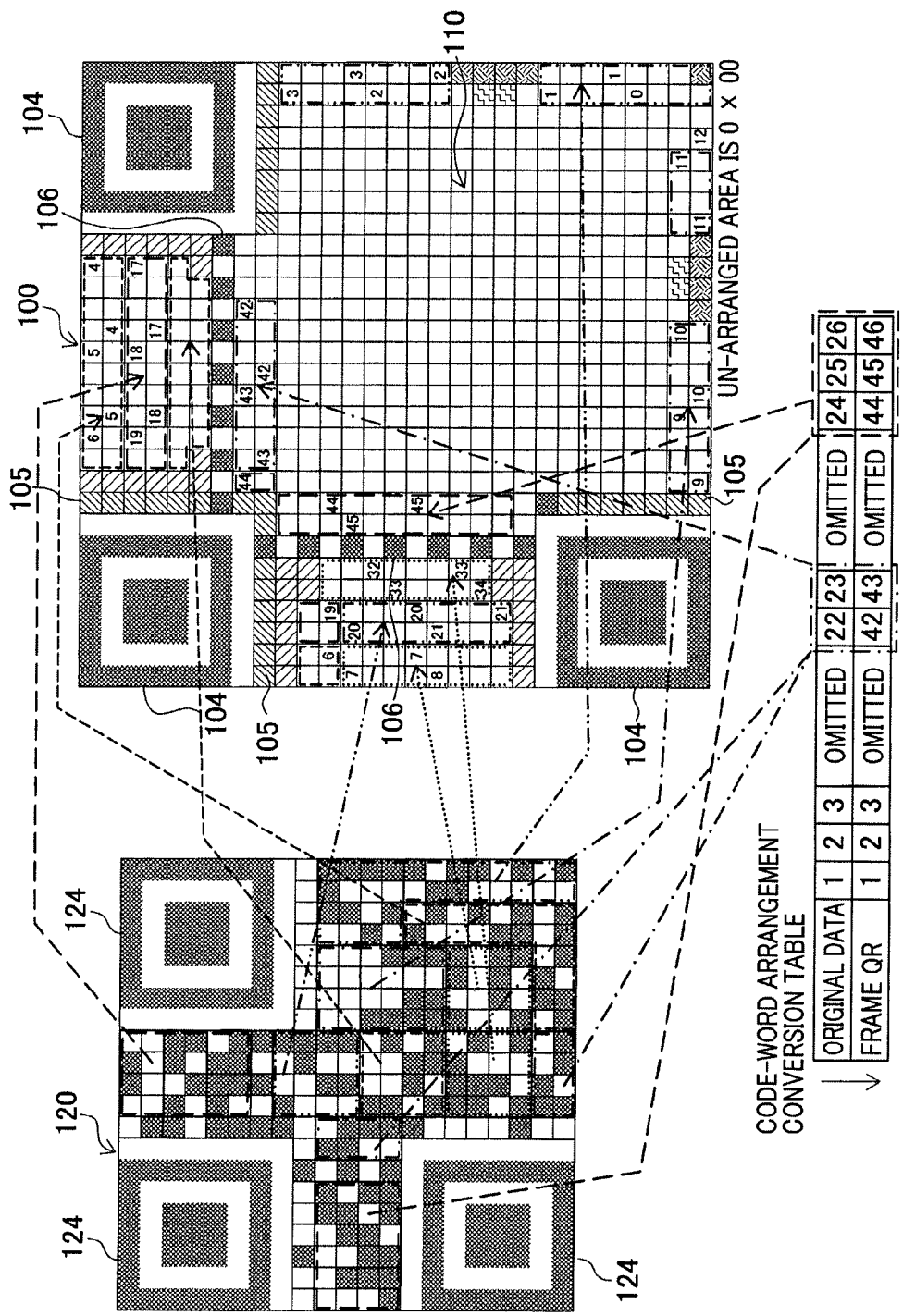
Figure 27:
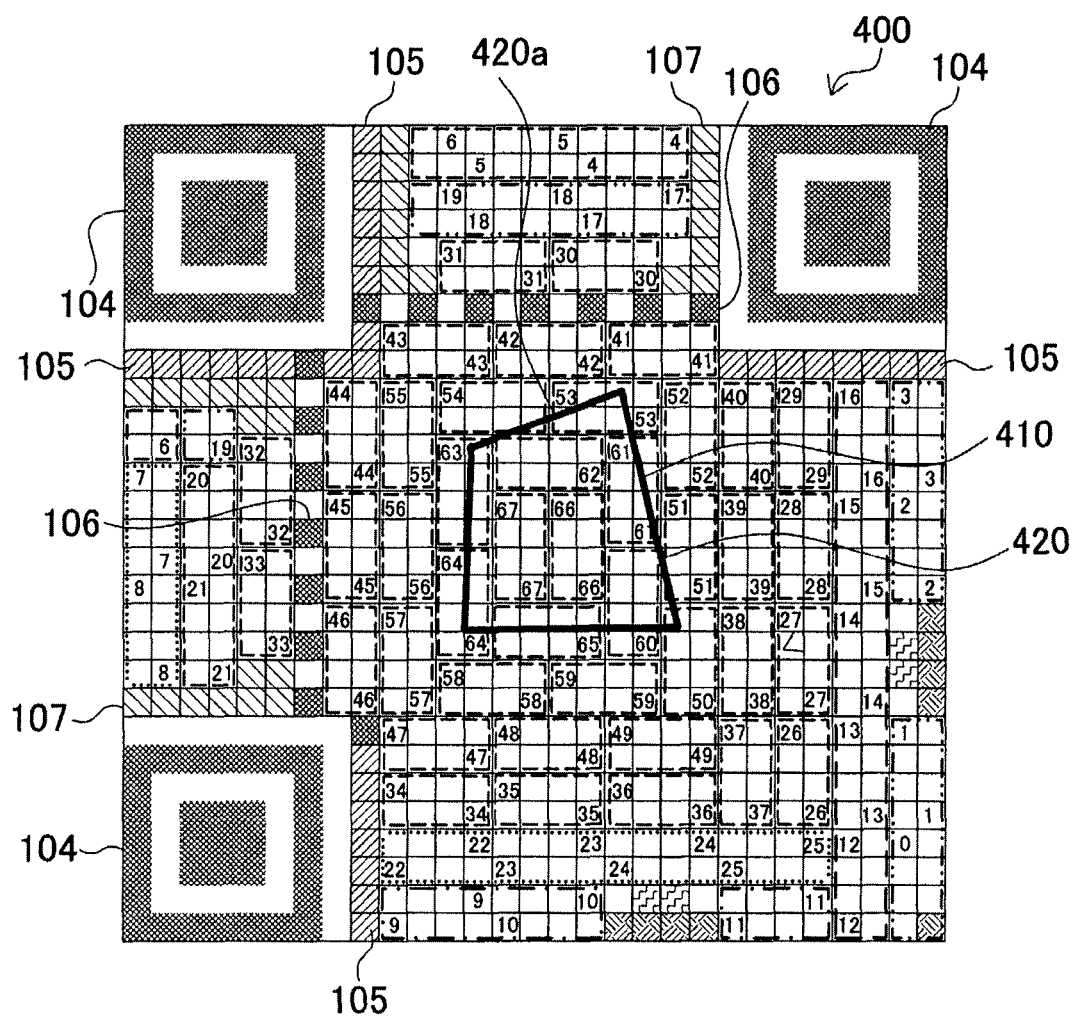
Figure 28:
Figure 29:
Figure 30:
Figure 31:
Figure 32:
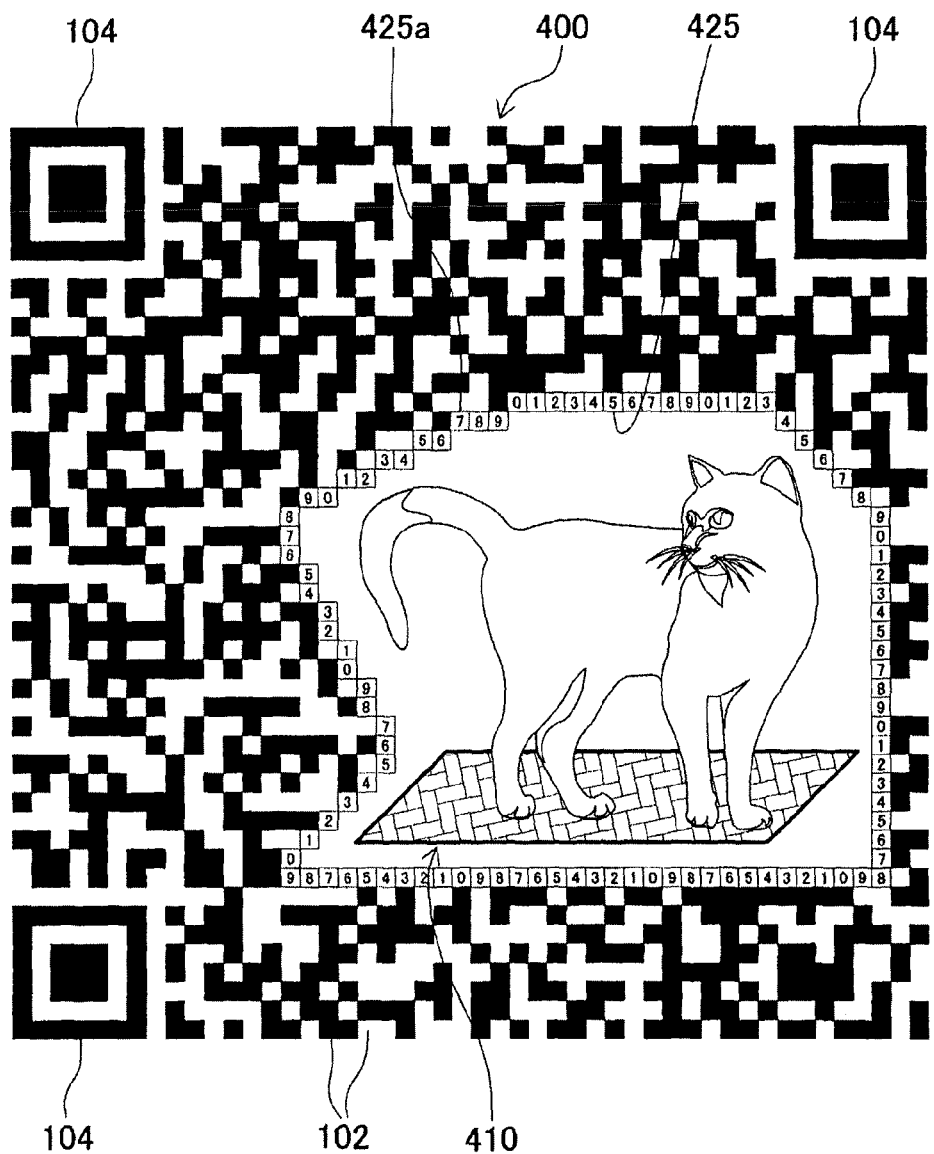
Figure 35:
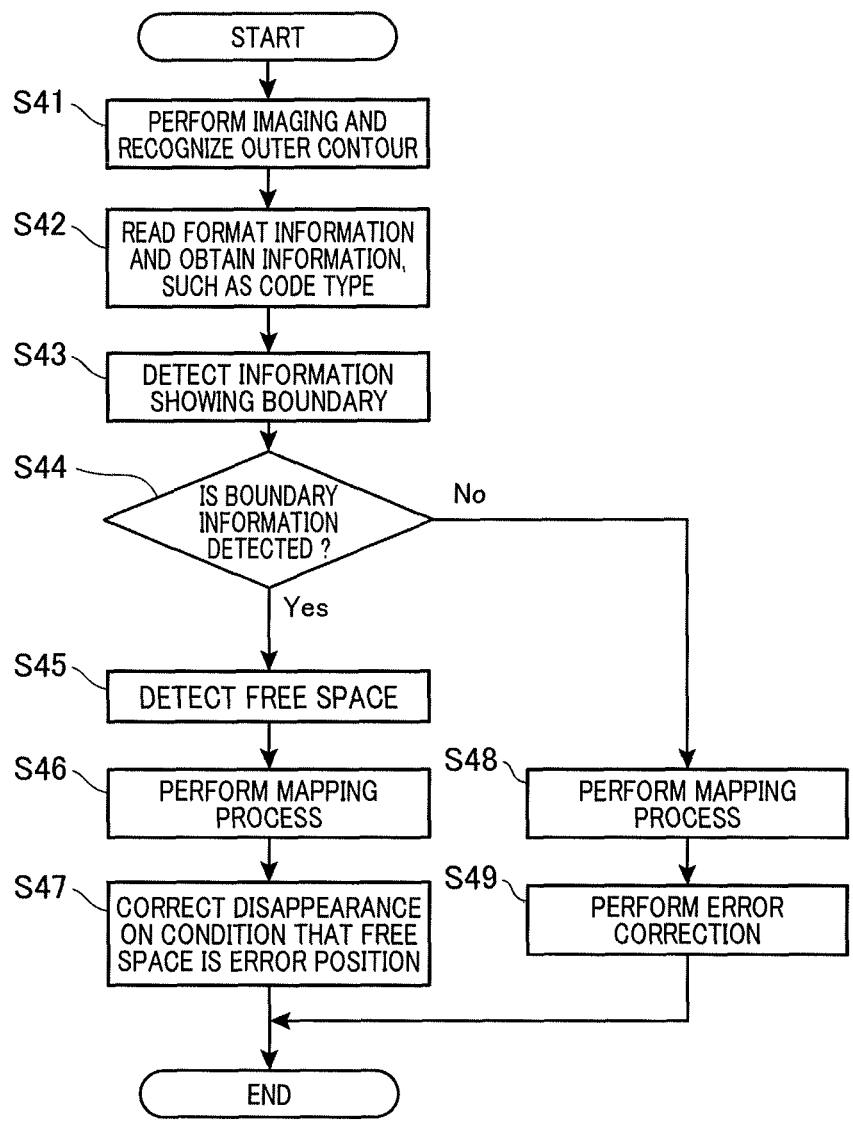
Figure 36:
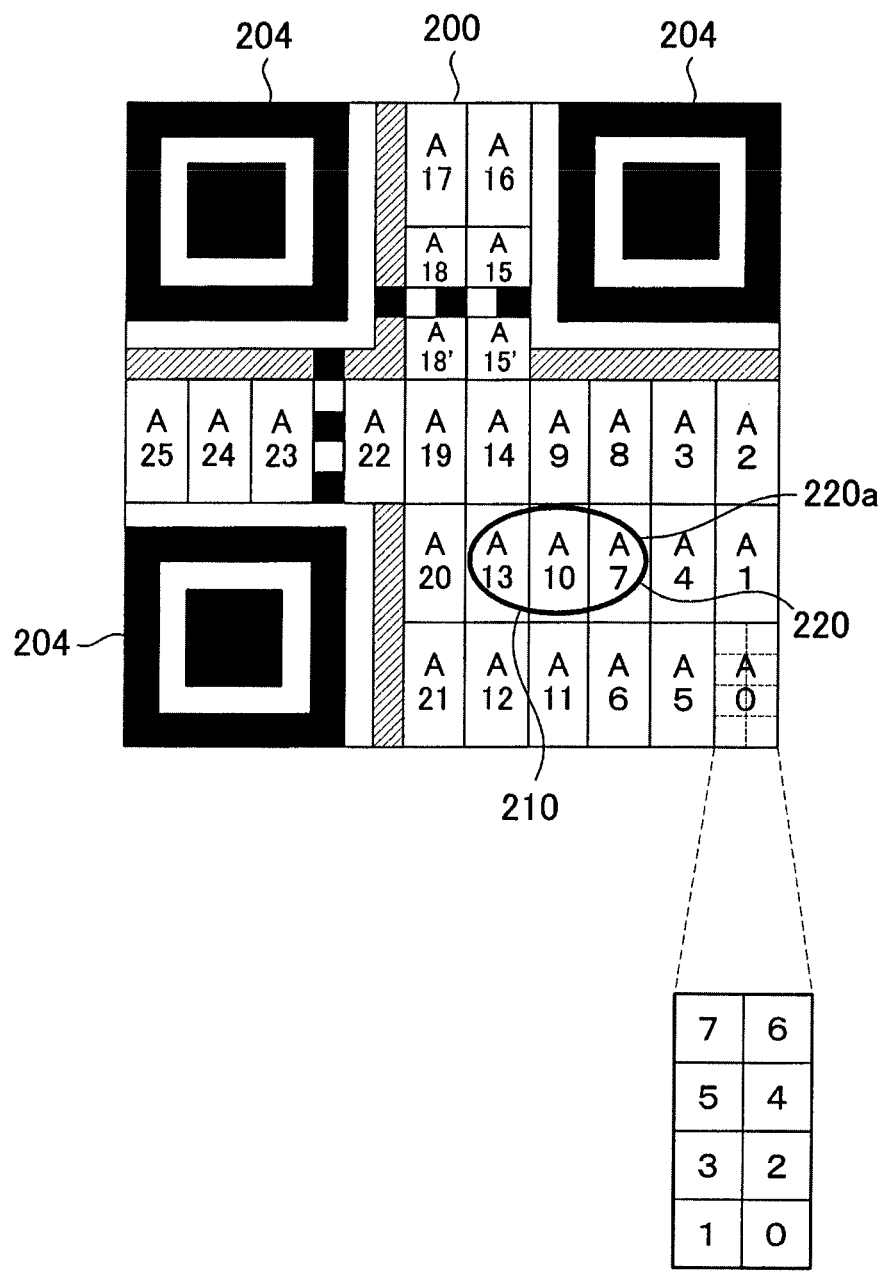

FIG. 15 is an explanatory diagram that conceptually explains the setting method for free space in USER MODE (manual mode);

FIG. 16 is an explanatory diagram that conceptually explains shape candidates of the free shape in FIX MODE;

FIG. 17 is an explanatory diagram that conceptually explains examples in which the basic shapes of the free space are rotated and arranged;

FIG. 18 is an explanatory diagram that conceptually explains an example in which a design is displayed in a rectangular free space;

FIG. 19 is an explanatory diagram that conceptually explains an example in which the free space is set to match the design;

FIG. 20 is an explanatory diagram of an arrangement example of code words and the like in the example in which the free space is set to match the design;

FIG. 21 is an explanatory diagram that conceptually explains a data configuration of the information code used in a variation example according to the first embodiment;

FIG. 22 is an explanatory diagram that conceptually explains a fixed region (static region) in which format information is recorded and a dynamic region in which data to be interpreted is recorded, in the variation example according to the first embodiment;

FIG. 23 is an explanatory diagram of an example in which the free space and the data storage region are changed when the fixed region (static region) is configured as in FIG. 22;

FIG. 24 is an explanatory diagram that explains an information code used in a system which uses an information code according to a second embodiment, in which FIG. 24(A) is a diagram of when the free space is blank and FIG. 24(B) is a diagram of when a design is attached to the free space;

FIG. 25 is an explanatory diagram that explains an information code used in a system which uses an information code according to a third embodiment, in which FIG. 25(A) is a diagram of when the free space is blank and FIG. 25(B) is a diagram of when a design is attached to the free space;

FIG. 26 is an explanatory diagram that explains the correspondence between the arrangement of each data word in an information code produced by the information code producing apparatus configuring the system which uses an information code in FIG. 1 and the arrangement of each data word in an other type of code, that has been changed to a correspondence differing from that in FIG. 5;

FIG. 27 is an explanatory diagram that conceptually explains the structure of an information code used by a system which uses an information code in a representative example according to a fourth embodiment;

FIG. 28 is an explanatory diagram of an example that specifies the structure of the representative example in FIG. 27;

FIG. 29 is an explanatory diagram that explains an information code used in the system which uses an information code in a second variation example according to the fourth embodiment;

FIG. 30 is an explanatory diagram that explains an information code used in the system which uses an information code in a third variation example according to the fourth embodiment;

FIG. 31 is an explanatory diagram that explains an information code used in the system which uses an information code in a fourth variation example according to the fourth embodiment;

FIG. 32 is an explanatory diagram that explains an information code used in the system which uses an information code in a second variation example according to the fifth embodiment;

FIG. 33 is an explanatory diagram that explains an information code used in the system which uses an information code in a second variation example according to the sixth embodiment;

FIG. 34 is an explanatory diagram that explains an example of application of other-type cells arranged in a boundary portion of the information code in FIG. 33;

FIG. 35 is a flowchart of an example of the process for reading an information code by an information code reader configuring a system which uses an information code according to a fifth embodiment; and FIG. 36 is an explanatory diagram that conceptually explains the structure of the information code used in the system which uses an information code according to the fifth embodiment.

DESCRIPTION OF EMBODIMENTS

[First Embodiment]

Referring to the drawings, a first embodiment of the present invention will now be described.

FIG. 1 shows a system 1 which uses an information code. The system includes an information code producing apparatus 2 and an information code reader 10. The information code producing apparatus 2 produces an information code 100 provided with a predetermined code area in which cells are arranged, the cells being units composing information. The information code reader 10 reads the information code 100 produced by the information code producing apparatus 2.

(Information Code Producing Apparatus)

The information code producing apparatus 2 is configured by an information processing apparatus, which is a personal computer for example. This apparatus 2 is provided with a controller 3 including a CPU, an operation unit 4 including a key board, a mouse and other input devices, and a storage 5 including memory devices such as a ROM, a RAM, a HDD, and nonvolatile memories. The apparatus 2 further includes a display unit 6 equipped with known display devices (such as a liquid crystal display and/or other types of display devices), a communication unit 7 functioning as a communication interface to and from external devices via wired or wireless communication, and a printer 8 (printing device). The printer 8 is similar in hardware to known printers and is capable of printing the information code 100 and necessary information in reply to printing data sent from the controller 3.

(Information Code Reader)

Figure 2:
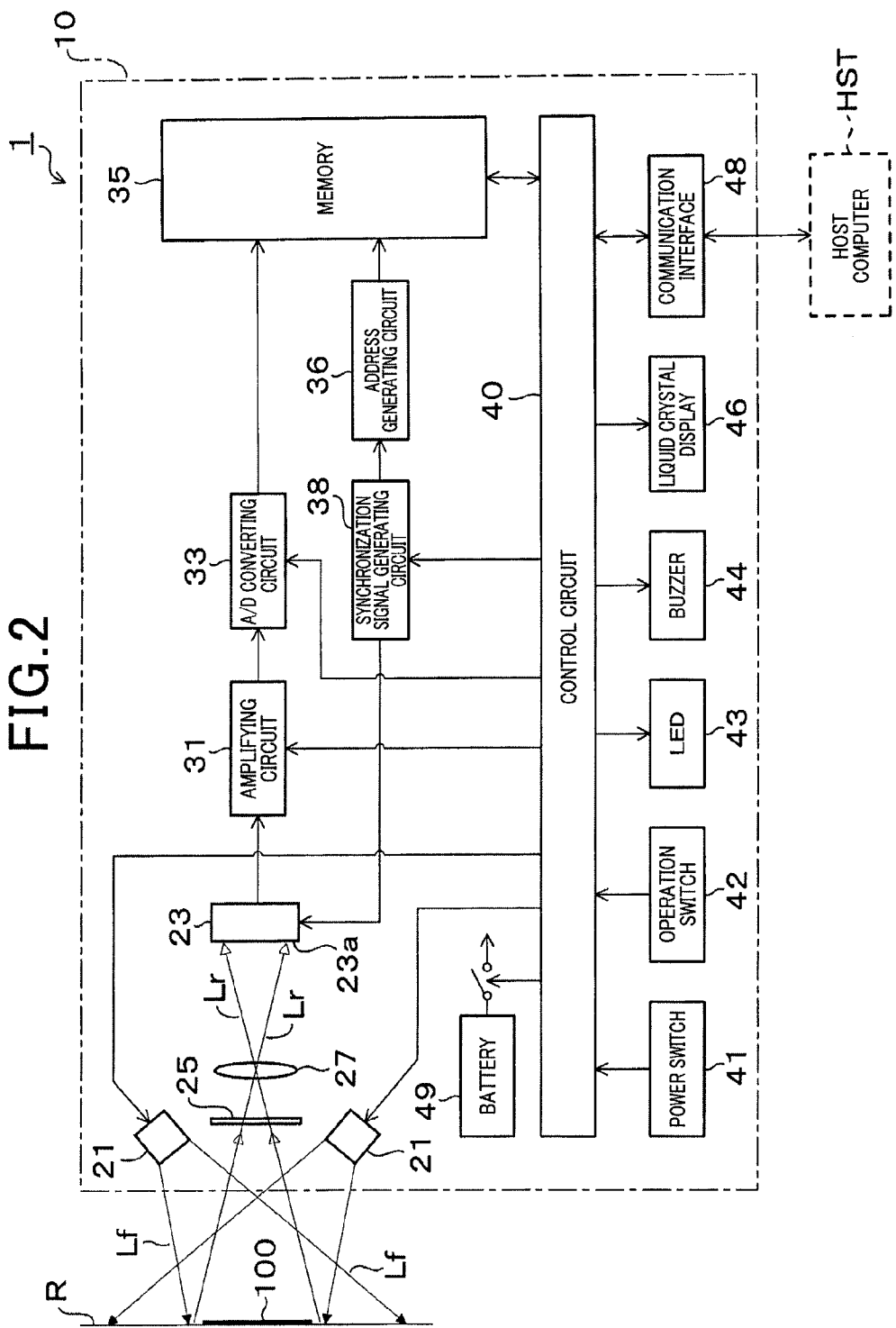
FIG. 2 is a block diagram exemplifying an outlined electric configuration of an information code reader composing part of the system shown in FIG. 1.

The whole configuration of the information code reader 10 will now be explained. As shown in FIG. 2, in terms of hardware configuration, the information code reader 10 is configured as a code reader capable of reading two-dimensional codes. The reader 10 has a not-shown outer casing, in which various kinds of electronic components are accommodated.

The information code reader 10 includes, as its main components, an optical system provided with illuminating sources 21, a light receiving sensor 23, a filer 25 and an imaging lens 27; a microcomputer system (hereinafter called "a microcomputer") provided with memories 35, a control circuit 40, an operation switch 42, and a liquid crystal display 46; and a power supply system provided with a power switch 41 and a battery 49. These components are mounted on not-shown printed boards and/or implemented in the case (not shown).

The optical system is configured to include the illuminating sources 21, light receiving sensor 23, filter 25 and imaging lens 27. The illuminating sources 21 function as light sources capable of emitting illuminating light Lf, and, for example, include red LEDs and lens systems disposed on the output side of the LEDs, in which the lens system include diffusing lenses and collecting lenses. In the present embodiment, the illuminating sources 21 are arranged on both sides of the light receiving sensor 23 and are able to emit the illuminating light Lf towards an object R being read via a reading opening (not shown) of the case. The object R being read is a medium carrying an information code or a medium in or on which an information code is arranged or mapped. The object R being read may be various objects such as resin materials or metal materials, and an information code 100 (later described), which are as shown in FIG. 1 for example, is produced on the object R being read, by printing or direct marking.

The light receiving sensor 23 is provided as one example of an imaging unit capable of imaging the information code 100 (which will be described later) and is able to receive reflected light Lr coming from the object R being read and the information code 100 which reflect the illuminating light. This light receiving sensor 23 is for example an area sensor in which light-receiving elements are arranged two-dimensionally, such elements being solid-state image sensing devices such as C-MOSs or CCDs. The light receiving sensor 23 is mounted on a not-shown printed circuit board and has a light receiving window 23a through which incident light arrives through the imaging lens 27, so that the sensor is able to receive the incident light.

The filter 25 is an optical low-pass filter disposed between the reading opening (not shown) of the case and the imaging lens 27. The filter 25 is able to, for example, allow to pass therethrough light whose wavelengths is equal to or less than a designated wavelength corresponding to the reflected light Lf and, in contrast, cut off light whose wavelength is over the designated wavelength. Hence unnecessary light components whose wavelengths are over that of the reflected light Lr are suppressed from incoming into the light receiving sensor 23. The imaging lens 27 is, by way of example, configured to include a lens barrel and a plurality of collecting lenses accommodated in the lens barrel. In the present embodiment, the imaging lens is configured to collect the reflected light Lr incoming through the reading opening (not shown) of the case, and form a code image of the information code 100 on the light receiving window 23a of the light receiving sensor 23.

The microcomputer system includes an amplifying circuit 31, an A/D converting circuit 33, a memory 35, an address generating circuit 36, a synchronization signal generating circuit 38, a control circuit 40, a power switch 42, an LED 43, a buzzer 44, a liquid crystal display 46, a communication interface 48, and other necessary components. In the microcomputer system, the control circuit 40 functioning as a microcomputer (i.e., information processing unit) and the memory 35 are key components in the function thereof, and image signals of the information code 100 imaged by the foregoing optical system can be processed.

An image signal (which is an analogue signal) outputted from the light receiving sensor 23 of the optical system is provided to the amplifying circuit 31 to be amplified there with a predetermined gain, and the amplified signal is then provided to the A/D converting circuit 33 to be converted to a digital signal from the analogue signal. The digitalized image signal, that is, image data (i.e., image information) is provided to the memory 35 so that the image data is stored in an image data storage area of the memory 35. The synchronization signal generating circuit 38 is configured to generate a synchronization signal sent to both the light receiving sensor 23 and the address generating circuit 36. The address generating circuit 36 is configured to generate addresses at which the image data are stored at the designated addresses in the memory 35, in response to the synchronization signal coming from the synchronization signal generating circuit 38.

The memory 35 is composed of memory devices such as semiconductor memory devices, which include RAMs (DRAMs, SRAMs, etc.) and ROMs (EPROMs, EEROMs, etc.). The RAMs of the memory 35 are arranged to provide not only the image data storage area, described above, but also an operation area and a reading condition table which are used during processing for arithmetic calculations and logic calculations performed by the control circuit 40. In the ROMs, system programs are stored in advance, which include predetermined programs assigned to a later-described reading process and other necessary programs, and which are used to control hardware components including the illuminating light sources 21 and the light receiving sensor 23.

The control circuit 40 is provided with a microcomputer configured to be able to control the information code reader 10, and the microcomputer includes a CPU, a system bus, and an input/output interface, whereby the microcomputer provides an information processing function. In the control circuit 40, the input/output interface is communicably connected to various input/output devices (called peripheral devices) which include, in the present embodiment, the power switch 41, the operation switch 42, the LED 43, the buzzer 44, the liquid crystal display 46 and the communication interface 48. The communication interface 48 is communicably connectable to the host computer HST and/or other systems which are provided as host systems of the information code reader 10.

The power system includes the power switch 41 and the battery 49, in which the power switch 41 can be turn on/off to control connection/disconnection of paths for drive voltage from the battery 49 to the foregoing devices and circuits, which is under control of the control circuit 40. The battery 49 is composed of a secondary battery capable of generating a predetermined DC voltage, and this battery is for example a lithium-ion battery.

(Information Code)

With reference to FIGS. 1, 5, and other drawings, an information code 100 used in the system which uses the information code shown in FIG. 1 will now be described. Two codes exemplified in FIGS. 1 and 5 are configured based on the same basic scheme for configuring the codes and have similar characteristics, although arrangement of cells and the sizes of specification patterns are different from each other in the two codes. An information code 100 shown in FIGS. 1, 5 and other drawings is produced by the foregoing information code producing apparatus 2, for example, and has a predetermined code area REG in which cells 102, each corresponding to a unit for displaying pieces of information, are arranged. In the information code 100 shown in FIGS. 1, 5 and other drawings, the "code area" is a rectangular region REG which can contain all of a plurality of dark cells (refer to FIGS. 1 and 5), and practically, is a minimum square or rectangular region which contains all of three position detecting patterns (finder patterns) 104.

Specifically the plurality of cells 102 are arranged or mapped according to a predetermined rule, so that the outer contours of some cells among those cells produce series of those contours which draw a square, rectangular, or other-shape area on or in a medium R differentiablly from the background. This area becomes the code area REG. Of course, when this information code is read, it is necessary that there is a quiet zone (margin) around the code area REG. The quiet zone should have a size corresponding to a given number or more of cells.

In the example shown in FIGS. 1, 5 and other drawings, each of the plurality of cells 102 is composed of a rectangular (e.g., square) light (e.g., white) cell or a rectangular dark (e.g., black) cell. Inside the code area, there is a free space (or called a canvas area) 110, which will be detailed later, and some of the cells 102 are located around the free space 110 in a matrix form. The terms "light color" and "dark color" of the light and dark cells are used herein to show representative colors which give a relative difference to luminance levels (i.e., contrast) when light reflects from the cells, so that the cells can be binarized to show a higher or lower luminance than a given threshold. Hence, it is not always confined to using the while and back cells. For example, the possibilities for light and dark colors are explained in detail by references such as "International Standard ISO/IEC18004, second edition 2006 Sep. 1, page 109, Annex M, "M1 Symbol contrast"".

In the information code 100, a light-color or dark-color margin zone is formed as a quiet zone to surround the code area. In the example shown in FIGS. 1, 5 and other drawings, a light-color margin zone is adjacent to surround the code area.

In the information code 100, there are provided a specification pattern region, a data recording region, and an error correction code recording region in its rectangular code (e.g., square, rectangular or any other shapes) code area. In the specification pattern region, predetermined-shaped specification patterns (practically, fixed-figure region wider in area than a single cell) are arranged. In the data recording region, data are recorded by the plurality of types of cells 102 and in the error correction code recording region, error correction codes are recorded by the plurality of types of cells 102. As shown in FIGS. 1, 5 and other drawings, by way of example, the specification patterns arranged in the information code 100 are the same in their shapes and positions as those of known predetermined models of a QR code (registered trademark) (in the example shown in FIG. 5, the predetermined models of the QR code standardized by JIS or other standards). In the example shown in FIGS. 1, 5 etc., three position detecting patterns (finder patterns) 104 are arranged at three corners of the code area respectively and, at predetermined positions, timing patterns 106 and alignment patterns 108 are arranged. The patterns 104, 106 and 108 serve as the specification patterns.

In this way, at the predetermined positions in the code area of the information code 100, there are arranged the fixed-shaped specification patterns (i.e., the position detecting patterns 104, timing patterns 106 and alignment patterns 108 (omitted from FIG. 5). The specification pattern regions are regions in which, for example, light-color cells and dark-color cells are arranged to show fixed patterns (i.e., fixed figures) whose size is larger than that of a single cell. For instance, in the information codes having the same version, the same specification pattern regions are arranged at the same positions, but only the data recording region and the error-correction-code recording regions, and the free space can be configured different from each other. Inside the code area, a space other than the later-described free space 110 is used for arrangement of such specification patterns, recording regions (each of which is the recording region or the error correction code recording region), and other necessary regions.

The reader 10 may use many methods to interpret the number of lines and the number of columns, which are composed of cells, of the information code 100, the shapes and positions of the specification patterns, the position of format information, candidate positions of code words (i.e., addresses specifying the arrangement order of code words), and others. For example, a plurality of versions may be set depending on types of the information code 100, where, for each of the versions, the number of lines of cells and the number of columns of cells, the shapes and positions of the specification patterns, the positions of format information, and candidate positions (addresses)) of code words may be predetermined. When version information is arranged at predetermined positions (reserved regions) in the code area, the reader 10 can understand the number of lines of cells and the number of columns of cells, the shapes and positions of the specification patterns, the position of the format information, the candidate positions (addresses) of code words in the information code 100, based on the version information. The reader 10 may use an alternative approach to understand the foregoing pieces of information.

In addition, inside the code area, the free space 110 is formed to have a size larger than the size of the single cell 102. This free space 110 is located at a region other than the specification pattern regions, the data recording region, and the error correction code recording regions. The free space 110 can be set as a region in which data on the cells 102 are not recorded and to which error correction on error correction codes are not applied. In the example shown in FIGS. 1, 5 etc., the data recording region and the error correction code recording regions are arranged along the inner ends of the code area so that such regions are located in a ring and rectangular shape, while the free space 110 is formed in a central part of the code area. How to arrange the free space 110 will be described later.

In the following, a representative example will be explained in which a code configuration assigned to a predetermined version drawn as the right figure in FIG. 5 is made to correspond to a code configuration assigned to a further version (i.e., version number) smaller than the predetermined version as the left figure in FIG. 5. Moreover, the positions of respective code words of the information code 100 drawn on the right side of FIG. 5 are made to correspond to the positions of respective code words of another type of code 120 drawn on the left side of FIG. 5 by an arrangement conversion table shown in the lower part of FIG. 5. In this example, as long as an amount of data can be stored in the other type of code 120 shown on the left side in FIG. 5, such data can expressed in a region which remains after formation of the free space 110 the information code 100 on the right side in FIG. 5. When the information code 100 on the right side of FIG. 5 is read, the code words of this information code 100 can be read such that they are code words of the other type of code 120 on the left side in FIG. 5.

On the right figure of FIG. 5, the regions of the respective code words, which are mapped around the free space 110, are conceptually shown by dashed line frames. Regions in which the format information (i.e., the cells at the predetermined positions 105) are conceptually shown by a predetermined type of hatched lines. The regions in which the format information or the code words are recorded are shown by only squares, omitting practical cell arrangements from being drawn. In addition, although the example shown on the right side in FIG. 5 provides the free space 110 located at the central part of the code area has squares drawn therein, the free space 110 can be configured freely, so that the free space 110 may be drawn with a design as shown in FIG. 1, with symbols and/or patterns, or with a blank. The free space 110 is formed such that the free space positionally corresponds to an arrangement of cells. In the present embodiment, the free space is also referred to as a canvas area.

Figure 6:
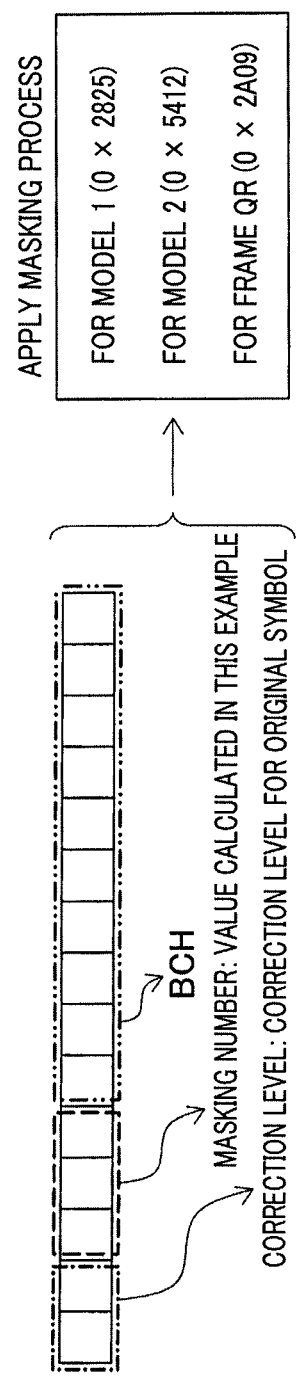
FIG. 6 is an illustration conceptually explaining the data format of the information code used in the system shown in FIG. 1.

The format information (type information) is configured as shown in FIG. 6 for example, and recorded at the predetermined positions 105 (portions with a predetermined type of hatched lines) in the information code 100. This recording is performed on a specified format configuration. The predetermined positions 105 exemplify the fixed regions whose positions are preset. This format information includes correction level information for specifying an error correction level and mask number information for specifying a mask number. The correction level information is to specify an error correction level used by the information code 100. The mask number is used to specify what type of masking has been applied to the code word region of the information code 100, where data code words and error correction code words are recorded in the code word region.

The format information shown in FIG. 6 is recorded so that a predetermined type of mask pattern (a specified mask) is reflected in the format information. The type of mask indicated by the format information is identified by a method similar to a known QR code, thus making it possible to detect a specified code type as shown on the right side in FIG. 5 (i.e., a code type with the free space 110). In the QR code (registered trademark) according to a known standard, when the QR code is configured on a model 1 for example, a mask for the model 1 is applied to the format information shown in FIG. 6, so that data (i.e., a cell arrangement) are produced by the masking and the produced data are recorded at predetermined positions. Similarly, in configuring the QR code on a model 2, a mask for the model 2 is applied to the format information shown in FIG. 6, so that data (i.e., a cell arrangement) are produced by the masking and the produced data are recorded at predetermined positions.

Meanwhile, in the information code 100 shown in FIG. 5 of the present embodiment (that is, in the special type of code with the free space 110), a specified mask which is different in type from the models 1 and 2 is applied to the format information shown in FIG. 6. This application produces an expression of data (i.e., an arrangement of cells), and the data are recorded in predetermined positions 105. In this example, the specified mask is exemplified as being for a casing trim QR (quick response) (or frame QR) in FIG. 6 and the frame QR is one kind of the two-dimensional code.

For any type selected from the models 1 and 2 on a known standard and the information code 100, the formal information is configured such that check digits for a correction level (correction level information) for recording and a mask number are included in the format information, and making for the selected type is then applied to the format information. Practically, a known masking process is performed using the mask pattern for each type, whereby bit patterns which have been mask-processed are recorded at the predetermined positions.

Accordingly, when the format information is masked by a specified mask (in FIG. 6, this specified mask is exemplified as being for the fame QR) and recorded at the predetermined positions 105, the cell information recorded at the predetermined positions 105 is released from being masked by using the specified mask and then interpreted so that the same check digits are revealed. Thus it can be determined that the type is for the information code 100.

In contrast, if the cell data at the predetermined positions in the information code 100 are un-masked based on the masks for the model 1 or 2, the check digits are produced differently from the originally added check digits. It can thus be determined that an information code is not according to the known models 1 and 2.

In this information code 100, the specification patterns (such as the position detecting patterns 104) are detected, and the same method as that for known QR codes is used to specify the direction of the code and the positions of the respective cells, before the format information recorded at the predestined positions are interpreted using the same method as that for the known QR codes. The type of a mask which has been disclosed through the interpretation provides the type of the information code 100, i.e., the type of this code is a special type with the free space 110. The interpreted format information results in determining both an error correction level used in the information code 100 and the type of a mask applied to the code word region (i.e., a region in which data code words and error correction code words are recorded).

Figure 3:
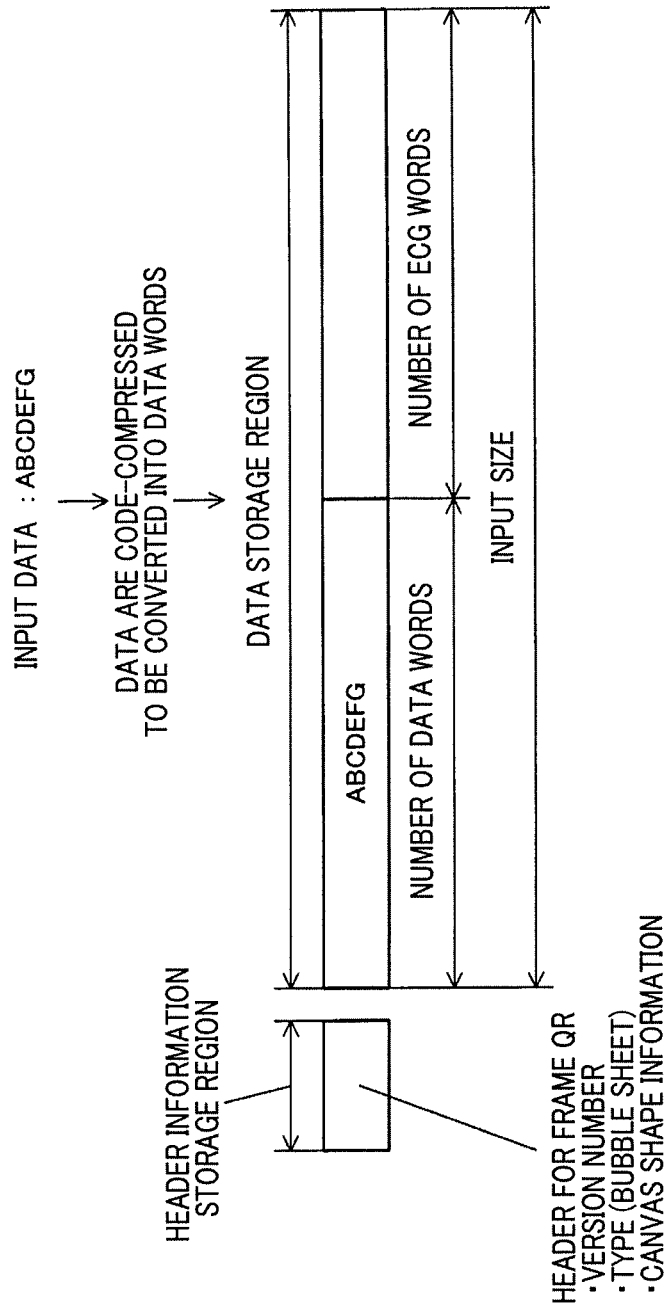
FIG. 3 is an illustration conceptually explaining the data configuration of an information code used in the system shown in FIG. 1.

Contents recorded in the information code 100 are formatted into a data arrangement as shown in FIG. 3, for example. Header data are put at the head of the data arrangement, which are followed by input data (i.e., data to be interpreted). In the example shown in FIG. 3, the input data (data to be interpreted) are compressed using a known compressing technique so that the input data are converted into data words (or data code words). The header data used in this information code 100 are also called "header for frame QR" in the following explanation.

Further, in the present disclosure, the data recording region is composed of regions in which the data words (data code words) of the header data and the input data are recorded and regions in which the forgoing format information are recorded. In the example shown in FIG. 3, there is recorded, as part of the header data (the header for the fame QR), information which is able to specify the type (version and format) of the other type of code 120 (which is a code used to interpret the information code 100 and is made to correspond to the information code 100 via the arrangement conversion table (shown in FIG. 5)). There is also recorded, as part of the header data, information shown in FIGS. 10 to 12 (which information is used to specify the position of the free space). This will be detailed later.

Furthermore, the input data (i.e., data words being interpreted) are followed by error correction code words (ECC words) which are error correction codes. In the information code 100, a region in which the error correction codes are recorded functions as an error correction code recording region. As a method of producing error correction codes (i.e., error correction code words) based on the data words (i.e., the header data and the input data (which are data to be interpreted) in the example shown in FIG. 3), methods based on known two-dimensional codes (such as QR codes) can be employed. By way of example, as a method of producing the error correction code words based on the data words (i.e., data code words), a production method for error correction code words regulated by JISX0510:2004 (which is JISX0510:2004, 8.5 error correction) can be used as one of known methods. This production method for the error correction code words is not limited to the foregoing, and this production may be performed using various other methods.

Moreover, in the information code 100, the respective data words (data code words) expressing data being interpreted (object data to be outputted) and the error correction code words are arranged or mapped within the code area on the basis of predetermined arrangement position information. In this configuration, as shown in FIG. 5, arrangement candidate positions for respective code words are defined previously in the code area of the information code 100, and the numbers (addresses) are assigned to the respective arrangement candidate positions. The arrangement position information specifies arrangement of the code words such that the respective code words composing the recording contents shown in FIG. 3 should be arranged at which of the arrangement candidate positions. In the example shown on the right figure in FIG. 5, the arrangement candidate positions Nos. 1-21 are outlined by way of example, in which the head and last bit portions are numbered for explicit showing in each of the arrangement candidate positions and arrangement candidate positions of Nos. 22 or higher are omitted from being drawn.

Specifically, in the case of the version of the other type of code 120 (in this case, a known QR code) where the version is specified by the header data shown in FIG. 3, known regulations or rules are applied to determine that each of the code words having an arrangement order should be arranged or mapped at which position in the other type of code 120. In interpreting the other type of code 120, the arrangements defined in this way are used to interpret the code words in the arrangement order.

The arrangement position information (the arrangement conversion table) is provided to make the numbers of the respective arrangement positions (i.e., arrangement positions of the code words according to the arrangement order) previously decided in the other type of code 120 correspond to the numbers of the candidate positions (i.e., the arrangement candidate positions of the code words) previously decided in the information code 100, respectively. To be more precise, in the arrangement position information, correspondence information showing "the arrangement position of the first code word in the other type of code 120 corresponds to the first arrangement candidate position in the information code 100", "the arrangement position of the second code word in the other type of code 120 corresponds to the second arrangement candidate position in the information code 100", "the arrangement position of the third code word in the other type of code 120 corresponds to the third arrangement candidate position in the information code 100", and so on, is recorded as, for example, table data. As a result, the arrangement positions of the code words numbered in the other type of code 120 are made to respectively correspond to the arrangement candidate positions of the information code 100.

Thus, in interpreting the information code 100, the code words at the arrangement candidate positions in the code area are re-arranged to arrangement positions in the other type of code 120 which arrangement positions are specified by the arrangement position information (i.e., the arrangement conversion table). The other type of code 120 thus re-arranged is then subjected to interpretation based on a known interpretation method, such as a known decoding method for the QR code.

For example, in the example shown FIG. 5, the code word at the first arrangement candidate position in the information code 100 is arranged at an arrangement position assigned to the first code word in the other type of code 120; the code word at the second arrangement candidate position in the information code 100 is arranged at an arrangement position assigned to the second code word in the other type of code 120; and so on. In this way, the re-arrangement is performed for every code word, and the other type of code (e.g., QR code) whose code words have been re-arranged is subject to a known interpretation method.

It is preferable that the arrangement position information (the arrangement conversion table) is owned, as common data (a common arrangement conversion table), by both the information code producing apparatus 2 producing the information code 100 and the information code reader 10 reading the information code 100.

(Information Code Production Process)

Next, an information code production process and an information code production method will be described with reference to FIG. 8 and other drawings. Hereafter, in the description, an example is given in which the other type of code 120 is a QR code (registered trademark) such as that in FIG. 5, and the information code 100 has a specification patterns similar to those in the QR code. In this example, the information code 100 having the free space 110 is also referred to as a "frame QR". The steps in the process related to production are indicated by "S". This method of description is similarly used in subsequent embodiments.

Figure 8:
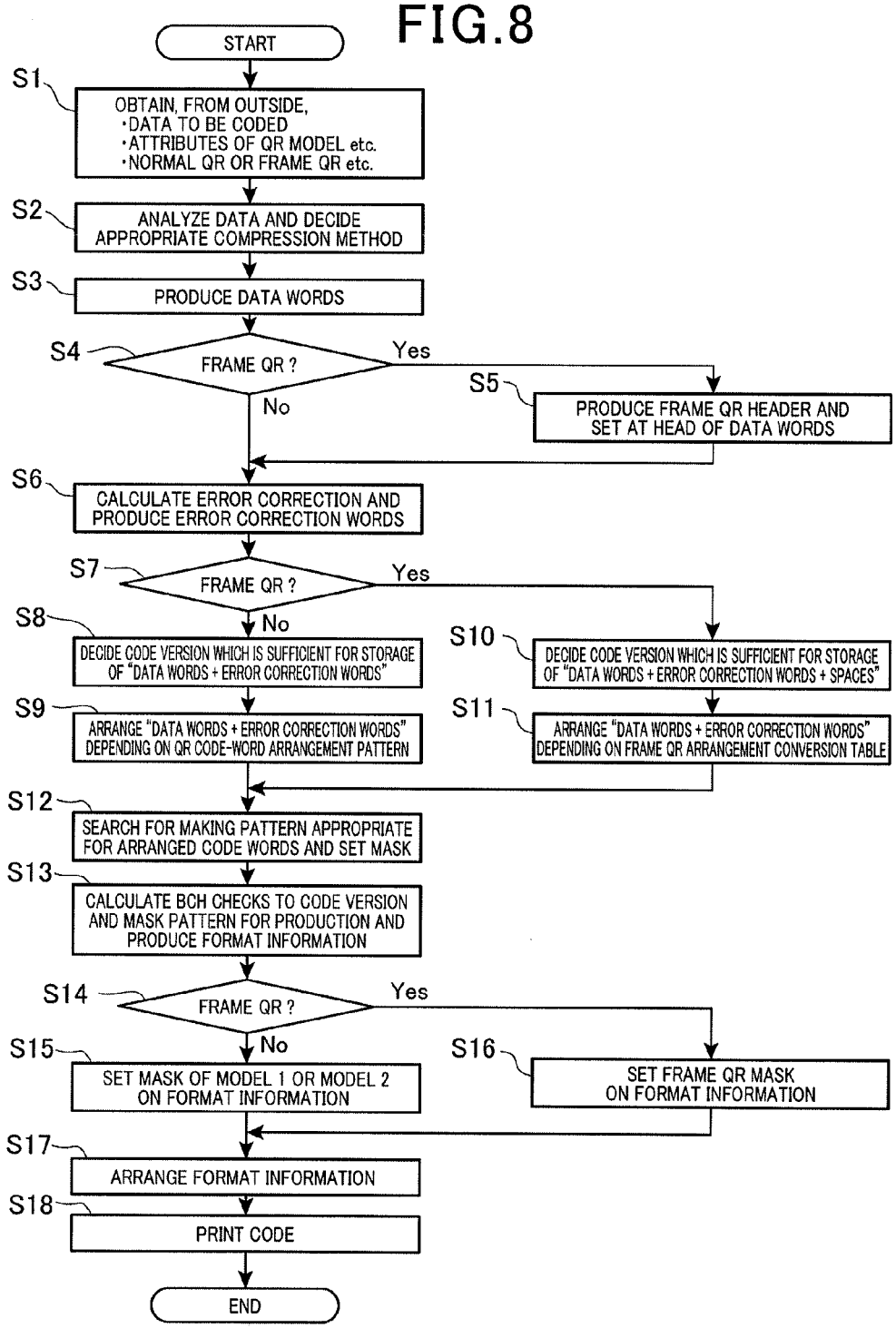
FIG. 8 is a flowchart exemplifying a flow of production of the information code produced by the information code producing apparatus composing the part of the system shown in FIG. 1.

The information code production process in FIG. 8 is a process performed by the information code production apparatus 2. For example, execution of the process is started by a predetermined operation in the operation unit 4. In this process, first, the information code production apparatus 2 obtains data to be coded (data to be interpreted), attribute data, and code type data (data specifying whether to generate the information code 100 or a typical two-dimensional code (such as a typical QR code)) from outside (S1). In the present configuration, the control unit 3 and the operation unit 4 correspond to an example of a "data obtaining unit", and function to obtain the data to be interpreted (input data from outside). In addition, this is not limited to such an example. For example, the control unit 3 and the communication unit 7 may be configured as the "data obtaining unit", and may function to obtain data inputted by communication from outside as the data to be interpreted.

After obtaining the data at S1, the information code production apparatus 2 determines the method for compressing the obtained data, using a publically known method (S2).

The information code production apparatus 2 then expresses the data in which the input data is compressed (data to be interpreted) by a plurality of data words (data code words) (S3). After S3, the information code production apparatus 2 determines whether or not the code type data acquired at S1 indicates the type (frame QR) of the information code 100 having the free space 110.

When determined that the code type data obtained at S1 indicates the type (frame QR) of the information code 100 having the free space 110, the information code production apparatus 2 proceeds to Yes at S4. The information code production apparatus 2 produces a portion of the unique header data (described above) used in the type (frame QR) of the information code 100 having the free space 110, and sets the produced portion of the header data at the head of the data arrangement including the plurality of data words, as in FIG. 3 (S5). At least information (such as version number information) enabling identification of the type (version and format) of the other type of code 120, described hereafter, is recorded in the header data in FIG. 3. In addition, when determined, at S4, that the code type data obtained at S1 does not indicate the type (frame QR) of the information code 100 having the free space 110 (when the data selects a typical two-dimensional code (for example, the data selects model 1 or model 2), the information code producing apparatus 2 proceeds to No at S4.

When proceeding to No at S4, the information code producing apparatus 2 produces an error correction code using a publically known method, based on the configuration of the data words (data code words) produced at S3, and generates a plurality of error correction words (error correction code words) expressing the error correction code (S6). Meanwhile, when proceeding from S4 to S5, the information code producing apparatus 2 produces the error correction code using a publically known method, based on the configuration of the final data words (a plurality of data code words expressing the header data and the input data) produced at S3 and S5, and produces a plurality of error-corrected words (error correction code words) expressing the error correction code (S6).

After S6, the information code producing apparatus 2 determines whether or not the code type data obtained at S1 indicates the type (frame QR) of the information code 100 having the free space 110 (S7). When determined that the code type data obtained at S1 does not indicate the type (frame QR) of the information code 100 having the free space 110, the information code producing apparatus 2 proceeds to No at S7. The information code producing apparatus 2 produces a two-dimensional code (such as a QR code) using a publically known method.

When proceeding to No at S7, the information code producing apparatus 2 determines the version of the two-dimensional code having a size capable of storing the data words (data code words) produced at S3 and the error-corrected words (error correction code words) produced at S6 (in this example, the version having a size capable of storing the data words produced at S3 and the error-corrected words produced at S6, among the plurality of versions of the standardized, publically known QR code). Based on an arrangement pattern determined in advance by the version, the information code producing apparatus 2 arranges the data words produced at S3 and the error-corrected words produced at S6 (S9).

Meanwhile, when the code type data obtained at S1 indicates the type (frame QR) of the information code 100 having the free space 110, the information code producing apparatus 2 proceeds to Yes at S7. The information code producing apparatus 2 determines the version of the two-dimensional code (the QR code in the examples in FIG. 5 and FIG. 8) that is capable of storing the data words (data code words) produced at S3 and S5, the error-corrected words (error correction code words) produced at S6, and the free space (S10). In the present configuration, the user is able to set the position and size of the free space. At S10, the information code producing apparatus 2 determines the version of the two-dimensional code based on the position and size of the free space set in this way.

In the examples in FIG. 5 and FIG. 8, for example, the version having a size capable of storing the data words (data code words) produced at S3 and S5, the error-corrected words (error correction code words) produced at S6, and the free space is determined, from among the plurality of versions (sizes) determined in advance for the type of the information code 100. When a plurality of versions having a size capable of storing the data words (data code words) produced at S3 and S5, the error-corrected words (error correction code words) produced at S6, and the free space are present, the smallest version may be selected from the plurality of versions.

Alternatively, the user may designate any version among the plurality of versions. When the information code 100 is produced, the size (number of rows and number of columns), the arrangement of the specification patterns, and respective candidate positions of the code words that are determined in advance in the version that has been determined as described above are used. In addition, the specific code word arrangement sequence is determined based on the above-described arrangement conversion table. An example in which a version such as that in the right-hand drawing in FIG. 5 is determined at S10 will be described in detail below.

Here, a method for setting the free space will be described.

Figure 7:
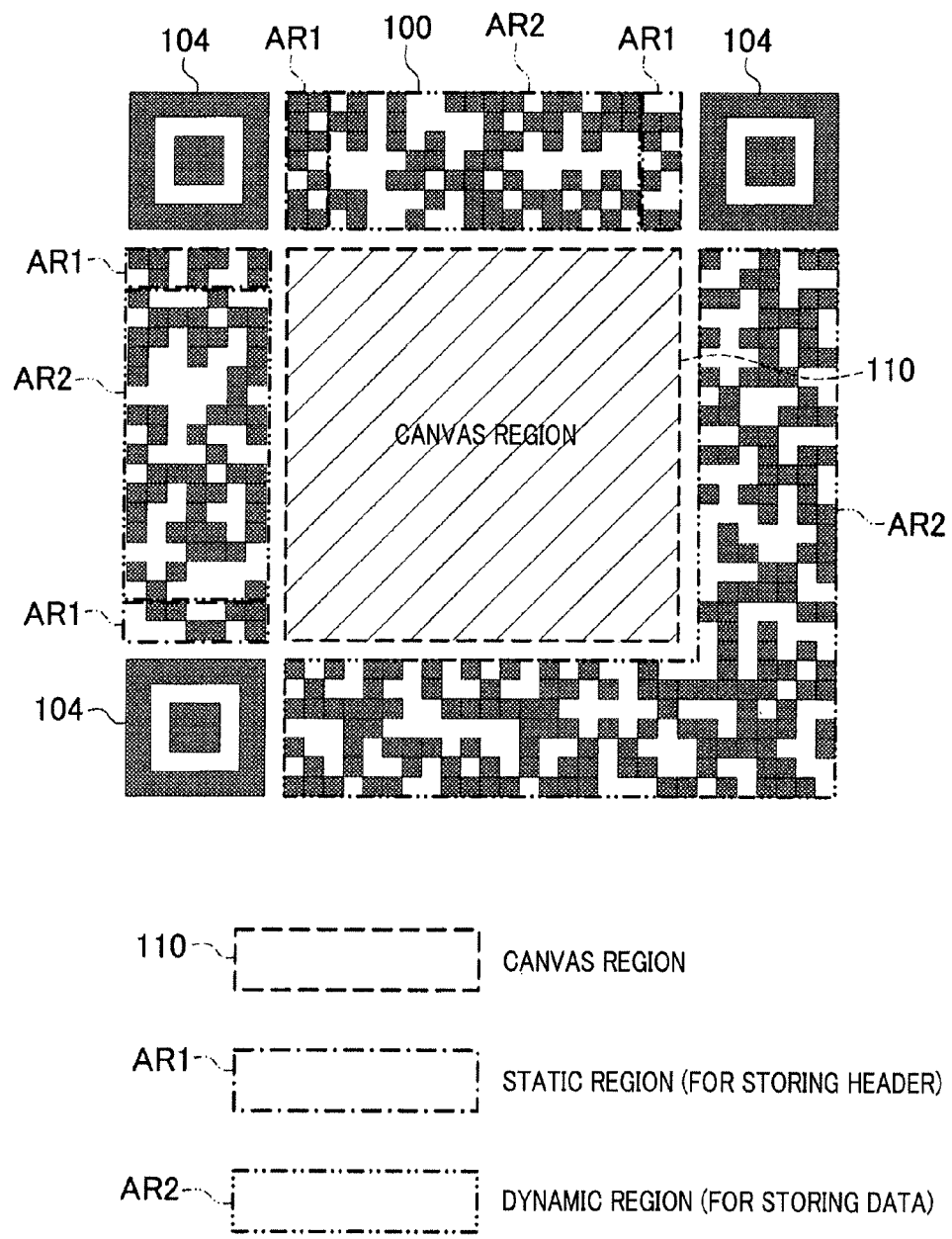
FIG. 7 is an illustration conceptually exemplifying both a fixed region (static region) in which format information is recorded and a dynamic region in which data to be interpreted are recorded.

In the present configuration, the shape of the free space can be determined by either of a first method (FIX MODE) in which the shape is selected from a plurality of candidate shapes, and a second method (USER MODE) in which the shape is set based on shape designation information inputted to the information code producing apparatus from outside. Regardless of which method is used to determine the free space, information specifying the method used to determine the shape of the free space and information specifying the position of the free space are recorded in a fixed region as format information. The position of the fixed region in which such format information is recorded is not particularly limited. For example, as conceptually shown in FIG. 7, an example is given in which the fixed region is set near the position detecting pattern 104.

In the present configuration, the data structure of the format information (the information enabling identification of the position of the free space) in FIX MODE is, in a simplified form, as shown in FIG. 10(A). More specifically, the data structure is as shown in FIG. 10(B). In addition, the data structure in USER MODE is as shown in FIG. 10(C). In either modes, the mode is identified by the first MD bit definition value (information specifying the method used to determine the shape of the free space). In other words, either of the FIX MODE and the USER MODE can be selected based on the selection of the MD bit definition value.

First, a setting example in FIX MODE will be described. FIX MODE is a mode in which a free space shape (also referred to, hereafter, as the canvas shape) that is defined in advance is used. A free space having a desired shape is set by selecting the position in which to arrange the free space having the candidate shape and selecting the rotation angle.

As a result of a configuration such as this, a canvas shape that best matches the countless illustration shapes designated by the user can be selected, while minimizing addition to information volume.

In FIX MODE, as shown in FIG. 11, the data specifying the position of the free space includes the MD bit that designates the mode, a CEN bit that specifies whether or not a center position is set, an SZ bit that specifies whether or not the size is changed, an ANG bit that specifies whether or not the rotation angle is changed, a MASK NO. bit that specifies the shape of the free space, and the like. Furthermore, the data includes a CENTER POS bit that designates the specific position of the center position, a SIZE bit that designates the specific size, and an ANGLE bit that designates the specific rotation angle.

In the present configuration, regardless of the version (code Ver.) of the information code 100, a CENTER POS coordinate system (a coordinate system for designating the specific position of the center position) is set to amount to four bits in a coordinate position shown in FIG. 13 (a position that is eight blocks away from a boundary (first boundary) of the code adjacent to two position detecting patterns, and a position that is eight blocks away from a boundary (second boundary) of another code adjacent to two position detecting patterns, based on block coordinates in which the overall code is divided into 16 equal sections. In other words, the CENTER POS coordinate system is set to a predetermined size (a size amounting to 16 blocks composed of 4×4 blocks, in the example in FIG. 13) in a position that is eight blocks away from the first boundary and eight blocks away from the second boundary.

When the CEN bit shown in FIG. 12 is 1, the canvas center position is set in the position (reference position) designated by the CENTER POS bit (reference position information specifying the reference position for arranging the free space). For example, in a candidate arrangement such as that in FIG. 13, the positions that are candidates for the center position are prescribed in advance. When a more specific center position is designated by the CENTER POS bit in FIG. 11, any of the center positions (the center position of any of the blocks among the 16 candidate blocks, in the example in FIG. 13) is designated among the plurality of candidate positions (candidate blocks) such as those in FIG. 13. For example, in the example in FIG. 14, an example is shown in which a first block is selected from among the 16 blocks, and the center position of the first block is designated.

As a result of the center position being changeable in this way, for example, position change can be performed from the basic positions of the free spaces such as in FIG. 16(A) to (J) to those in FIG. 17(B) to (H). When the CEN bit is 0, for example, the CENTER POS=0, and the center position of the 0-th block is designated as the center of the free space.

In addition, when the SZ bit is set to 1, the SIZE bit that designates the size designates the number of blocks with which to compose the canvas radius (radius of a circumscribing circle containing the free space), with a single block as the smallest unit. For example, when the SIZE bit is 0, the candidate shape of the free space is arranged such as to be inscribed within a circle having a radius amounting to a single block. In addition, as shown in FIG. 14, when the SIZE bit is 5, the candidate shape (a triangle in the example in FIG. 14) of the free space is arranged such as to be inscribed within a circle having a radius amounting to six blocks.

In addition, when the ANG bit is 1, the ANGLE bit designates the rotation angle of the free space. For example, the designation value is configured by two bits. The rotation angle is, for example, designated within a range of 0° to 45° in 15° units. In other words, any angle among 0°, 15°, 30°, and 45° can be designated by the designation value of the ANGLE bit (rotation angle information specifying the rotation angle from the reference arrangement of the candidate shape). The basic posture of each candidate shape at 0° is determined in advance as shown in FIG. 16. The basic postures correspond to the basic arrangements. As a result of the ANGLE bit being designated in this way, a basic graphical form such as that in FIG. 16(E) can be rotated as in FIG. 17(A). As a result of the information designating the rotation angle of the free space shape (canvas shape) in this way being added to the frame QR header, the free space shape (canvas shape) can be more freely selected. However, the resolutions of the angle designation value and the like are proportional to the amount of increase in header information. Therefore, values, such as those in 15° units (0° to 45°), that minimize increase in information volume are preferable.

The MASK NO. bit enables designation of any graphical form among candidate graphical forms such as those in FIG. 16. In the present configuration, each candidate graphical form is assigned a numerical value. As a result of any of the numerical values being designated by the MASK NO. bit, the shape of the free space corresponding to the numerical value can be designated. For example, a graphical form such as that in FIG. 16(A) is assigned 0, and a graphical form such as that in FIG. 16(B) is assigned 1.

In this case, when 1 is designated as the MASK NO. bit, the graphical form such as that in FIG. 16(B) is designated as the basic shape of the free space. If as many shapes as possible that are frequently used are registered as the mask patterns, rotation angle designation and size designation can be easily omitted. Reduction in information volume in the frame QR header can be facilitated. Therefore, the code region can be more efficiently configured. In this way, as a result of the format information such as that in FIG. 11 being recorded in the data region, the reader 10 can identify, in detail, the specific position (in particular, the coordinates of the center position within the code region, shape, rotation angle from the basic posture, and size of the free space) of the free space based on such format information.

In addition, in the present configuration, for example, among all of the code words of which the positions are determined within the code region as in FIG. 5, code words that do not include the free space, specified as described above, are to be interpreted. The reader 10 may, for example, read the code words that do not include the free space in order from that with the smallest number, among the code words that are numbered in sequence as in FIG. 5.

Next, a setting example in USER MODE will be described. In USER MODE, a plurality of pieces of coordinate designation information (shape designation information) can be inputted, for example, through external input by operation of the operation unit 4, or through input by data transmission from an external apparatus (not shown) or the like. The plurality of pieces of coordinate designation information (shape designation information) can be recorded in a fixed region within the code region as format information, such as that in FIG. 12. In this case, in the code region, the positions designated by the plurality of pieces of coordinate designation information (shape designation information) are determined to be outer edge portions of the free space. Specifically, as in the example in FIG. 15, the vertex coordinate positions of a polygon can be arbitrarily designated. As a result of a configuration such as this, a canvas shape that best matches the countless illustration shapes designated by the user can be selected, while minimizing addition to information volume.

Specifically, USER MODE is a mode that enables, for example, canvas shape definition by arbitrary designation of a maximum of 32 points. In USER MODE, the coordinates of each vertex position is designated on a coordinate system that is divided into 64 blocks (six bits) composed of eight blocks down and eight blocks lateral across, regardless of the version (code Ver.) of the information code 100, as shown in FIG. 15(A). As shown in FIG. 12, in USER MODE, the MD bit is designated as 1. In addition, the number of coordinates of the vertex positions is designated by a POINT NUM bit shown in FIG. 12. (POS1 bit to POSn bit), amounting to the number designated by the POINT NUM bit, are included as coordinate designation information designating each coordinate position.

For example, when the number of coordinates of the vertex positions is designated as 5 by the POINT NUM bit, the vertex positions are respectively indicated by the coordinate information on five vertex positions, POS1 bit, POS2 bit, POS3 bit, POS4 bit, and POS5 bit. As shown in FIG. 15(A), the information (POS1 bit to POSn bit) indicating each coordinate position is information designating any block among 64 blocks, composed of 8×8 blocks, that have been shifted by one block in the rightward direction and one block in the downward direction from the above-described coordinate system that is divided into 64 blocks (six bits). When any of the blocks is designated by the POS bit, the center position of the block becomes the vertex position. For example, when the 17th block is designated by the POS1 bit, the vertex position designated by the POS1 bit is the center position of the 17th block.

In this way, when a plurality of blocks are designated by the information (POS1 bit to POSn bit) designating each coordinate position on the coordinate system that is divided into 64 blocks (six bits), a line connecting the vertex positions of the blocks become the outer edge position of the free space (see FIG. 15(A)).

Upon setting the free space in this way, after S10, the information code producing apparatus 2 arranges the data words (data code words) produced at S3 and S5 and the error-corrected words (error correction code words) produced at S6 based on the above-described arrangement position information (arrangement conversion table). In the information code producing apparatus 2, the above-described arrangement position information (arrangement conversion table) is stored in the storage 5. In the arrangement conversion table, as described above, each arrangement position (the arrangement positions of the code word made to be ordered) determined in the other type of code 120 is associated with a candidate position (arrangement candidate position of each code word) determined in advance in the information code 100.

Figure 4:
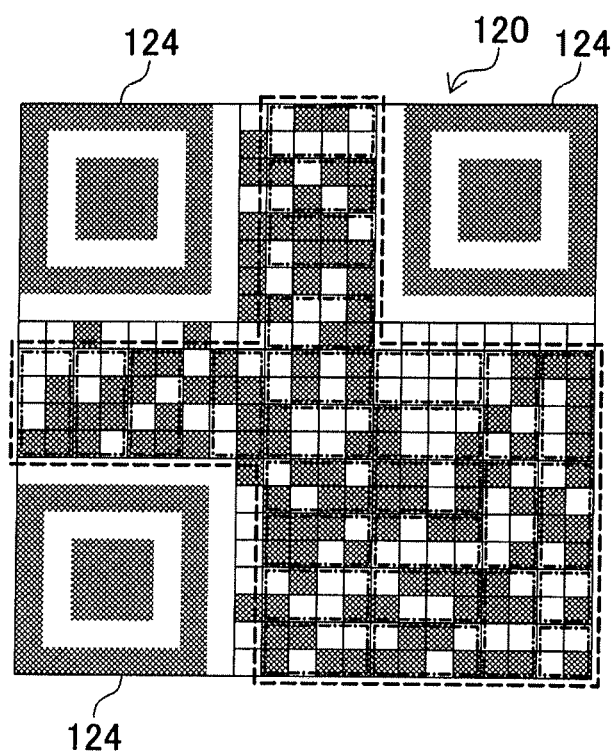
FIG. 4 is an illustration explaining another type of code corresponding to the information code used in the system shown in FIG. 1.

In the process at S11, the information code producing apparatus 2 identifies the arrangement position of each code word (each code word in the sequence) when the code words to be recorded (the data words (data code words) produced at S3 and S5 and the error-corrected words (error correction code words) produced at S6) are expressed by the other type of code 120 (the two-dimensional code having a size that is smaller than the information code 100, and is capable of storing the data words produced at S3 and S5 and the error-corrected words (error correction code words) produced at S6) shown in FIG. 4 and in the left-hand diagram in FIG. 5. The information code producing apparatus 2 then arranges each code word in the sequence in the arrangement candidate position within the information code 100 associated with the arrangement position of each code word in the sequence, based on the arrangement position information (arrangement conversion table).

For example, in the arrangement position information (arrangement conversion table) in FIG. 5, the arrangement position of the first code word in the other type of code 120 is associated with the first arrangement candidate position in the information code 100. Therefore, the first code word among the code words to be recorded (the data words produced at S3 and S5 and the error-corrected words produced at S6) is arranged in the first arrangement candidate position within the information code 100.

In addition, the arrangement position of the second code word in the other type of code 120 is associated with the second arrangement candidate position in the information code 100. Therefore, the second code word among the code words to be recorded is arranged in the second arrangement candidate position within the information code 100. In this way, when the arrangement position of the N-th code word in the other type of code 120 is associated with the M-th arrangement candidate position in the information code 100, the N-th code word among the code words to be recorded is arranged in the M-th arrangement candidate position within the information code 100.

In other words, if considering only the data words produced at S3 and S5 and the error-corrected words produced at S6, the data words and the error-corrected words can be expressed by the other type of code 120 (configured as a publically known QR code) having a smaller size than the information code 100. However, when the data words produced at S3 and S5, the error-corrected words produced at S6, and the free space 110 are to be stored, the data words, the error-corrected words, and the free space 110 are required to be expressed by the information code 100 having a larger size.

Therefore, according to the present embodiment, the data words produced at S3 and S5, the error-corrected words produced at S6, and the free space 110 are expressed by the information code 100 having a large size. The correspondence between the arrangement of the code words when the data words produced at S3 and S5 and the error-corrected words produced at S6 are expressed by the other type of code 120 (the publically known QR code) and the arrangement of the code words when storing in the information code 100 that has a larger size is able to be identified by the arrangement conversion table determined in advance.

In the present configuration, the "arrangement conversion table" such as that in FIG. 5 corresponds to an example of "arrangement position information that specifies each arrangement position when a plurality of data words expressing data to be interpreted are arranged in a code region". The arrangement conversion table (arrangement position information) is configured as information that prescribes the association between each data word in a sequence when the data to be interpreted is expressed by a plurality of data words and each arrangement position within the code region of each data word in the sequence. In addition, the storage 5 corresponds to an example of an "arrangement position information recording unit", and functions to record the data of such an arrangement conversion table (arrangement position information).

After S9 or S11, the information code producing apparatus 2 determines the mask pattern to be applied to the code words of which the arrangement locations have been determined at S9 or S11, using a predetermined publically known method (such as a publically known method used for QR codes). The information code producing apparatus 2 then applies the mask using a publically known masking process method, such as to reflect the determined mask pattern in the code words for which the arrangement locations have been determined at S9 or S11 (S12). Then, the information code producing apparatus 2 calculates a check digit based on the information on the mask pattern (masking number) set at S12 and the information on error correction level, and generates format information including the error correction level, the mask number, and the check digit, as shown in FIG. 6 (S13).

When the code type data acquired at S1 indicates the type (frame QR) of the information code 100 having the free space 110, the information code producing apparatus 2 proceeds to Yes at S14. The information code producing apparatus 2 performs a masking process to reflect the above-described specified mask (frame QR mask) in the format information produced at S13 (see FIG. 6). Meanwhile, when the code type data acquired at S1 does not indicate the type (frame QR) of the information code 100 having the free space 110, the information code producing apparatus 2 proceeds to No at S14. The information code producing apparatus 2 sets a mask (mask of model 1 or mask of model 2) of a different mask pattern than the mask pattern set at S16. After applying the mask to the format information at S15 or S16, the information code producing apparatus 2 arranges the format information that has undergone the masking process in a predetermined position within the code region (S17)

After producing the information code 100 or another two-dimensional code in this way, the information code producing apparatus 2 prints the code by the printing unit 8 (S18). At S18, rather than printing, the information code producing apparatus 2 may display the information code 100 or the like in the display unit 6. Alternatively, the information code producing apparatus 2 may transmit data of the information code 100 produced by the processes up to S17 to an external apparatus.

In the present configuration, the control unit 3 of the information code producing apparatus 2 corresponds to an example of a "data recording region generating unit". When the free space 110 is to be provided within the code region, the data recording region is generated such that the format information is recorded in a predetermined position within the code region in a specific format configuration, and each data word expressing the data to be interpreted (input data) obtained by the data obtaining unit is arranged based on the arrangement position information recorded in the arrangement position information recording unit. In addition, in the "data recording region generating unit" configured by the control unit 3, when the free space 110 is to be provided within the code region, the cell arrangement in the predetermined position 105 is configured in a state in which the mask pattern of a predetermined type (specific mask) is reflected.

In FIG. 4 and FIG. 5, the other type of code 120 corresponds to the position detecting pattern 104 of the information code 100 and includes the position detecting patterns 120 that are automatically produced in three corners.

(Information Code Reading Process)

Next, a process that is performed when the information code reader 10 in FIG. 2 reads the information code 100 shown in FIG. 1, the right-hand drawing in FIG. 5, and the like will be described. The steps in the process related to reading are indicated by "S". This method of description is similarly used in subsequent embodiments.

Figure 9:
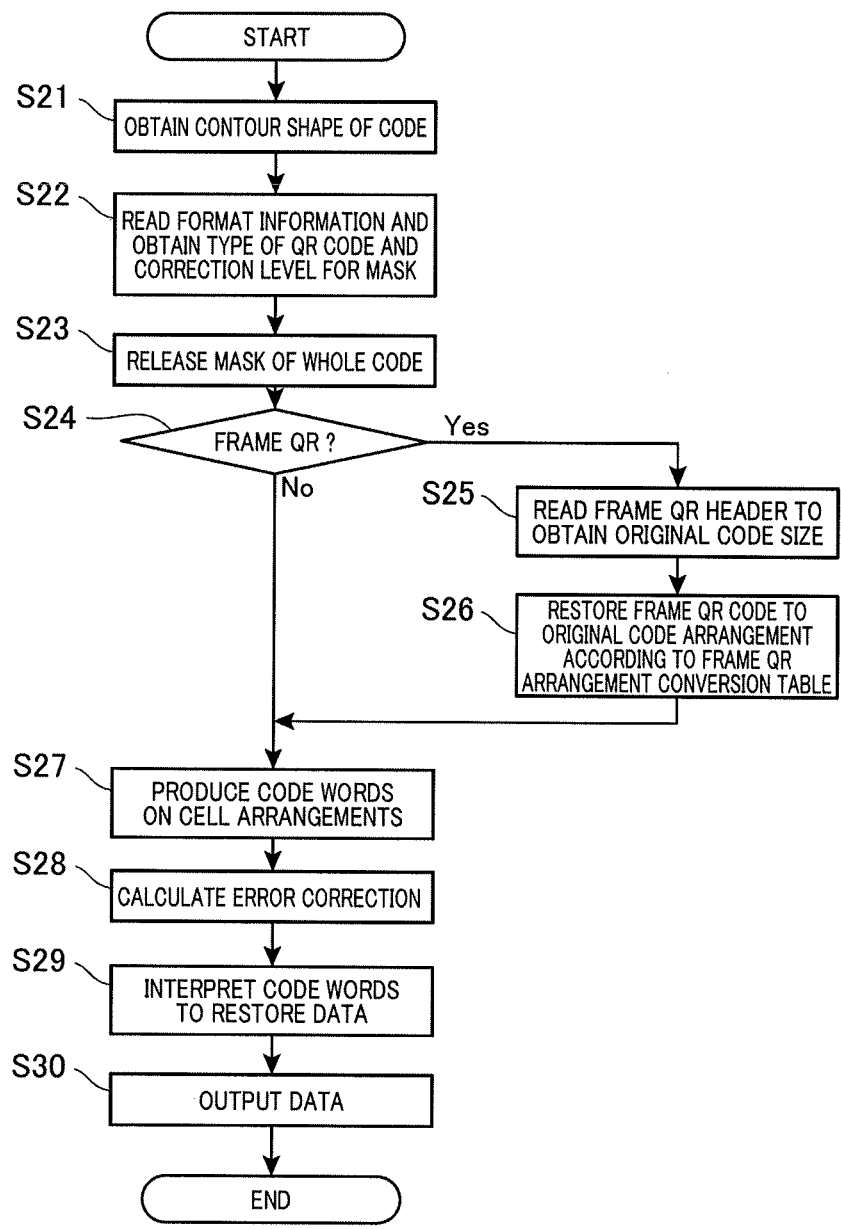
FIG. 9 is a flowchart exemplifying a flow of reading the information code produced by the information code producing apparatus composing the part of the system shown in FIG. 1.

The reading process in FIG. 9 is performed, for example, when the user performs a predetermined operation (such as operating the operation switch 42). First, as indicated in S21 in FIG. 9, the reader 10 captures an image of the information code 100 and obtains the image of the information code 100. The reader 10 also detects the contour shape of the information code 100. Specifically, the reader 10 detects the position detecting pattern 104 using a publically known method (a publically known method used for QR codes), and detects the contour shape of the information code 100 using a publically known method used for QR codes. The light receiving sensor 23 corresponds to an example of an "imaging unit" and functions to capture an image of the information code 100 produced by the information code producing apparatus 2.

After S21, the information code reader 10 interprets the information (format information) in a predetermined position in the information code 100, and obtains the type of information code and the mask correction level (S22). As described above, when the check digit matches when the masking process is released based on the above-described specific mask (mask for frame QR) and the information recorded in the predetermined position 105 is interpreted, identification can be made that the type is the type of the information code 100 (the type having the free space 110), and the error correction level and the masking number included in the format information can also be obtained. Then, the information code reader 10 releases the mask of the whole code (specifically, the code word region) based on the masking number included in the format information acquired at S22 (S23).

Then, when the information code 100 having the free space 110 is to be read (in other words, when mask release by the above-described specific mask (mask for frame QR) is successful), the reader 10 proceeds to Yes at S24. The reader 10 interprets the header data (frame QR header: FIG. 3) provided at the head of the data words, and thereby identifies the original code size (version and format of the other type of code 120) (S25). The reader 10 restores the arrangement from that of the information code 100, such as that shown in the right-hand drawing in FIG. 5, to that of the original code (other type of code 120), such as that shown in the left-hand drawing in FIG. 5, based on an arrangement conversion table similar to that in FIG. 5 (S26). Specifically, the reader 10 rearranges the code word in each arrangement candidate position in the information code 100 to the arrangement position within the other type of code 120 associated with the arrangement candidate position in the arrangement conversion table.

When determined No at S24 or after S26, the reader 10 identifies and generates each recorded code word from the cell arrangement (when proceeding to No at S24, the cell arrangement of the QR code to be read, and when following S26, the cell arrangement of the other type of code 120 arranged at S26) (S27). Then, the reader 10 performs error correction calculation using a publically known method based on the error correction code words in the error correction code recording region, and interprets the code words in the data recording region (S29). The reader 10 then outputs the data interpreted at S29 through display in a display unit, data transmission, printing, or the like (S30). In the process at S30, the data interpreted at S29 may be outputted as is, or other processes may be added.

In addition, during the reading process in FIG. 9, as a result of the format information being read, information such as that in FIG. 11 and FIG. 12 (information specifying the free space) can be obtained. As a result of the information specifying the free space in this way (FIG. 11 and FIG. 12), the detailed position of the free space can be identified. Therefore, for example, when analysis (such as image recognition, image cutout, or other analysis processes) of the inside of the free space is performed, the free space can be accurately identified based on the detailed position information of the free space such as this.

In addition, the reading process method is not limited to the above-described example. For example, after recognition of the position detecting pattern 104, the detailed position of the free space may be identified based on the format information, and only the region of the code words that do not include the free space, among the candidate regions of the code words, may be interpreted in sequence. The regions of all of the code words are determined in advance, and can be ascertained by the reader 10. Therefore, as long as the detailed position of the free space can be identified, the reader 10 can identify the regions of the code words that do not include the free space. Therefore, such regions of the code words may merely be interpreted in sequence.

In the present configuration, the control circuit 40 corresponds to an example of a "determining unit". When the image of the information code 100 is captured by the imaging unit, the control circuit 40 functions to determine whether or not the predetermined position 105 of the code region has a specific format configuration. Specifically, the control circuit 40 functions to determine whether or not a mask pattern of a predetermined type (specific mask) is reflected in the predetermined position 105.

The control circuit 40 corresponds to an example of an "interpreting unit". When an image of the information code 100 is captured by the imaging unit, the control unit 40 functions to interpret the data recorded in the data recording region based on the contents of the data recording region and the error correction code recording region. Specifically, when the determining unit determines that the predetermined position 105 has the specific format configuration (more specifically, when the mask pattern of the predetermined type is reflected in the predetermined position 105), the control circuit 40 functions to identify the position of each data word within the code region based on the correspondence information (arrangement conversion table) recorded in the correspondence information recording unit, and interpret the data to be interpreted.

The arrangement conversion table corresponds to an example of "correspondence information". The arrangement conversion table is configured as information that determines each correspondence position within the other type of code 120 when each data word in a sequence expressed in each arrangement position in the code region is expressed by a format (a format determined by a publically known standard or the like) that is determined in advance in the other type of code 120 that differs from the information code 100. When the determining unit determines that the predetermined position 105 has the specific format configuration, the control circuit 40 corresponding to the interpreting unit then functions to interpret the other type of code 120 in a configuration in which each data word in the sequence expressed in each arrangement position in the code region is converted to each correspondence position within the other type of code 120 determined by the correspondence information.

(Main Effects of the Present Configuration)

In the present configuration, a free space that is a region in which data to be interpreted is not recorded by cells can be provided in positions other than the specification pattern regions within the code region. Convenience can be further improved. In particular, because the free space is a region in which data to be interpreted is not recorded, restrictions attributed to the data recording region can be minimized when configuring the free space. Furthermore, the shape of the free space is determined by at least either of the method for selecting the shape from among a plurality of candidate shapes prepared in advance or the method of setting the shape based on shape designation information inputted from outside into the information code producing apparatus.

Therefore, the shape of the free space is not set to a uniform fixed shape. The degree of freedom in selection of the shape of the free space can be increased. Therefore, the shape of the free space is more easily matched with the display content within the free space. Furthermore, a more efficient data arrangement can be performed. For example, when the free space such as that in FIG. 18 is uniformly used for a displayed graphic form such as that in FIG. 18, inefficiency occurs in terms of recording data. However, in the present configuration, for example, an efficient arrangement matching the design becomes possible as shown in FIG. 19 and FIG. 20. Data can be more efficiency recorded.

The information code 100 in which a region other than the data recording region, the error correction code recording region, and the specification pattern regions is ensured within the code region can be produced. In particular, the free space 110 is not subjected to error correction by the error correction code recording region. Error correction codes are not required to be set for the free space 110. Therefore, the error correction codes can be efficiently and effectively attached to the data recording region.

In addition, the information code producing apparatus 2 includes: the data obtaining unit that obtains data to be interpreted; the arrangement position information recording unit that records the arrangement position information specifying each arrangement position when the plurality of data words expressing the data to be interpreted are arranged in the code region; and a data recording region generating unit that, when the free space 110 is to be provided in the code region, records the format information in the predetermined position within the code region in a predetermined format configuration, and generates the data recording region such that each data word expressing the data to be interpreted obtained from the data acquiring unit is arranged based on the arrangement position information recorded in the arrangement position information recording unit.

Meanwhile, the information code reader 10 includes: the correspondence information recording unit that records correspondence information that is information corresponding to the arrangement position information recorded in the arrangement position information recording unit and is information specifying each arrangement position of the plurality data words in the code region; a determining unit that, when an image of the information code 100 is captured by the imaging unit, determines whether or not the predetermined position of the code region has a predetermined format configuration; and an interpreting unit that, when the determining unit determines that the predetermined position has the predetermined format configuration, identifies the position of each data word within the code region based on the correspondence information recorded in the correspondence information recording unit and interprets the data to be interpreted.

In this configuration, as a result of the information code reader 10 confirming the format configuration of the predetermined position 105 by the determining unit, whether or not the code is the characteristic information code 100

(information code 100 having the free space 110) produced by the information code producing apparatus 2 can be determined. When determined that the predetermined position 105 has the specific format configuration, the information code reader 10 can identify the position of each data word within the code region based on the information (correspondence information) enabling identification of each arrangement position of the plurality of data words in the code region, and can thereby interpret the data to be interpreted.

The data recording region generating unit of the information code producing apparatus 2 configures a cell arrangement of the predetermined position 105 in a state in which a mask pattern of a predetermined type is reflected, when the free space 110 is provided in the code region. The determining unit of the information code reader 10 determines whether or not the mask pattern of the predetermined type is reflected in the predetermined position 105 when an image of the information code 100 is captured by the imaging unit. The interpreting unit of the information code reader 10 interprets the data to be interpreted under a condition that the mask pattern of the predetermined type is reflected in the predetermined position 105.

In this configuration, whether or not the code is the characteristic information code 100 (information code 100 having the free space 110) produced by the information code generating apparatus 2 can be determined with certainty by the type of mask pattern applied to the predetermined position 105. The "specific format configuration" can be easily actualized while suppressing data volume in the format information.

In addition, the arrangement position information (correspondence information) is information that prescribes the association between each data word in a sequence when the data to be interpreted is expressed by a plurality of data words and each arrangement position within the code region of each data word in the sequence. Specifically, the arrangement position information is information that prescribes each correspondence position within the other type of code 120 when each data word in the sequence indicated in each arrangement position in the code region is expressed in the other type of code 120 differing from the information code 100

When the determining unit determines that the predetermined position 105 has the specific format configuration, the interpreting unit interprets the other type of code 120 in a configuration in which each data word in the sequence indicated in each arrangement position in the code region is converted to the correspondence position within the other type of code 120 prescribed by the correspondence information. In this configuration, the characteristic information code 100 (information code 100 including the free space 110) can be favorably read using the reading scheme of the other type of code 120.

[Variation Example of the First Embodiment]

Next, a variation example of the first embodiment will be described.

According to the above-described embodiment, the format information is recorded in the fixed area AR1 (header information storage region), without the data to be interpreted and the error correction data being recorded. The data to be interpreted and the error correction data are recorded in the data storage region AR2 other than the fixed region (other than the fixed region AR1). However, the present invention is not limited to this example.

For example, as shown in FIG. 21 and FIG. 22, a configuration is possible in which a portion (conceptually indicated as "AB" in the example in FIG. 21) of the data to be interpreted (conceptually indicated as "ABCDEFG" in the example in FIG. 12) that should be recorded in the information code 100 is recorded in an extra region other than the recording region of the format information in the fixed region AR1. The remaining portion of the data to be interpreted (conceptually indicated as "CDEFG" in the example in FIG. 21) is recorded in the data storage region AR2 outside of the fixed region (outside of the fixed region AR1). As a result, the fixed region AR1 that is used for recording format information can also be used as a recording region for the data to be interpreted. Therefore, a larger amount of data can be more efficiently recorded.

Specifically, as shown in FIG. 21 and FIG. 22, the code region is divided into a header information storage region (fixed region AR1) that includes the frame QR header and a portion of the data to be interpreted and the data storage region AR2 that stores the remaining portion of the data to be interpreted. The header information storage region (fixed region AR1) is an area that is not affected by the free space shape (mask shape) regardless of the type of free space shape (mask shape). For example, as in FIG. 21, error correction codes for the recorded data may be added independently in each of the fixed region AR1 and the data storage region AR2. A restorable data structure may thereby be obtained. In this configuration, the storage region (fixed region AR1) of the frame QR header can be identified regardless of the shape of free space (canvas shape). For example, even when the free space shape (canvas shape) is as in FIG. 22, or even when the free space shape (canvas shape) is as in FIG. 23, the storage area (fixed region AR1) of the frame QR header can be identified, and the specific position of the free space can be identified based on the recorded content thereof (content such as those in FIG. 11 and FIG. 12).

In this configuration as well, when reading, first, the data in the header information storage region (fixed region AR1) that is not affected by the free space shape (canvas shape) is decoded. The frame QR header information is read from the decoded data string. The specific position of the free space (canvas shape mask) is ascertained based on information such as that in FIG. 11 and FIG. 12, and the position of the free space is identified. Then, based on the identification result, the information in the overall code (code words arranged outside of the free space) can be read by a method similar to that according to the first embodiment. In addition, the data within the header information storage region (fixed region AR1), in addition to the frame QR header information, a portion (conceptually indicated as "AB" in the example in FIG. 12) of the data portion is arranged in the extra region. As a result of combination with the data in the data storage region AR2 (conceptually indicated as "CDEFG" in the example in FIG. 12), the overall data to be interpreted can be obtained. As a result, data can be arranged in the respective regions without waste. In addition, as a result of a configuration such as this, the storage volume of QR header information can be easily expanded.

[Second Embodiment]

Next, a second embodiment will be described.

The system which uses an information code according to the second embodiment is identical to that according to the first embodiment in terms of hardware configuration. A configuration such as that shown in FIG. 1 and FIG. 2, described above, is used.

In the system which uses an information code according to the second embodiment, the information code producing apparatus 2 (see FIG. 1 and the like) generates an information code 200 such as that in FIG. 24(B). In this configuration as well, specification pattern regions in which specification patterns (such as the position detecting patterns 204) each having a shape determined in advance are arranged, and a data recording region in which data is recorded by cells of a plurality of types are provided within the code region. A free space 210 is provided in a position other than the specification pattern regions within the code region, such as to have a predetermined size that is larger than the size of a single cell. In the free space 210, at least either data recording or design display is possible by a method differing from the method for recording data in the data recording region. The shape of the free space 210 can be selected by a method similar to that according to the first embodiment.

Other than the configuration of the free space 210, this configuration is that of a publically known QR code (registered trademark). First, as shown in FIG. 24(A), the specification pattern regions, the data recording region, and the error correction code recording region in which the error correction codes are recorded by cells of a plurality of types are provided within the code region. The method for recording the data code words in the data recording region and the method for recording the error correction code words in the error correction code recording region are similar to those for the publically known QR code (registered trademark). For example, the arrangement of the position detecting patterns 204 within the code region, the arrangement of the data code words in the data recording region, and the arrangement of the error correction code words in the error correction code recording region are prescribed by a format standardized by JISX0510.

However, as shown in FIG. 24(A), an information code 200' is produced in which the code words in some regions are configured as code words expressed only by white cells. The region AR expressed only by white cells in this way is set as the free space 210. As shown in FIG. 24(B), at least any of a graphic form, a pattern, a color, a design combining the foregoing, or information indicated by a single or a plurality of symbols is displayed within the free space 210. When a design D is displayed in the free space 210 as in FIG. 24(B), the configuration differs from that of original data display as in FIG. 24(A). However, data error in this free space 210 can be corrected by publically known error correction using the error correction codes recorded in the error correction code recording region.

In addition, in the information code 200 shown in FIG. 24(B), the position of the free space 210 is specified in advance. Therefore, when a design or information is added and displayed within the free space 210, an error position due to display is known in advance. Thus, the error correction codes in the error correction code recording region can also be configured such that disappearance correction is performed with the position of the free space 210 as the error position. In this case, as a result of information indicating the position of the free space 210 (position data enabling identification of the position of the free space, produced by a method such as that according to the first embodiment or the second embodiment) being recorded in advance in the data recording region or in the reader 10 (FIG. 1), the reader 10 can identify the position of the free space 210 during reading (in other words, the position of the data code words in which an error has occurred). The reader 10 can perform elimination correction using the error correction codes recorded in the error correction code recording region such as to correct the error in the data code words present in the free space 210 of which the position has been identified in this way.

[Third Embodiment]

Next, a third embodiment will be described.

In a system which uses an information code according to the third embodiment as well, the hardware configuration is identical to that according to the first embodiment. A configuration such as that shown in FIG. 1 and FIG. 2, described above, is used.

In the system which uses an information code according to the third embodiment, the information code producing apparatus 2 generates an information code 300 such as that in FIG. 25(B). In this configuration as well, the specification pattern regions in which specification pattern each having a shape determined advance (an L-shaped alignment pattern 304a, and timing cells 304b in which light cells and dark cells are arranged such as to alternate one by one and that configures an L-shaped region along the boundary of the code region) are arranged, and the data recording region in which data is recorded by cells of a plurality of types are provided within the code region.

A free space 310 is provided in a position other than the specification pattern regions within the code region, such as to have a predetermined size that is larger than the size of a single cell. In the free space 310, at least either data recording or design display is possible by a method differing from the method for recording data in the data recording region. The shape of the free space 310 can be selected by a method similar to that according to the first embodiment.

Other than the configuration of the free space 310, this configuration is that of a publically known data matrix code. First, as shown in FIG. 25(A), the specification pattern regions, the data recording region, and the error correction code recording region in which error correction codes are recorded by cells of a plurality of types are provided within the code region. The method for recording data code words in the data recording region and the method for recording error correction code words in the error correction code recording region are similar to those for a publically known data matrix code. The arrangement of the alignment pattern 304a and the timing cells 304b within the code region, the arrangement of the data code words within the data recording region, and the arrangement of the error correction code words within the error correction code recording region are prescribed, for example, based on ECC200 version.

However, as shown in FIG. 25(A), an information code 300' is produced in which the code words in some regions are configured as code words expressed only by white cells. The region AR expressed only by white cells in this way is set as the free space 310. As shown in FIG. 25(B), at least any of a graphic form, a pattern, a color, a design combining the foregoing, or information indicated by a single or a plurality of symbols is displayed within the free space 310. When a design D is displayed in the free space 310 as in FIG. 25(B), the configuration differs from that of original data display as in FIG. 25(A). However, data error in this free space 310 can be corrected by publically known error correction using the error correction codes recorded in the error correction code recording region.

In addition, in the information code 300 shown in FIG. 25(B), the position of the free space 310 is specified in advance. Therefore, when a design or information is added and displayed within the free space 310, an error position due to display is known in advance. Thus, the error correction codes in the error correction code recording region can also be configured such that elimination correction is performed with the position of the free space 310 as the error position. In this case, as a result of information indicating the position of the free space 310 (position data enabling identification of the position of the free space, produced by a method such as that according to the first embodiment or the second embodiment) being recorded in advance in the data recording region or in the reader 10 (FIG. 1), the reader 10 can identify the position of the free space 310 during reading (in other words, the position of the data code words in which an error has occurred). The reader 10 can perform elimination correction using the error correction codes recorded in the error correction code recording region such as to correct the error in the data code words present in the free space 310 of which the position has been identified in this way.

[Fourth Embodiment]

Next, a fourth embodiment will be described. First, a representative example according to the fourth embodiment will be described.

In a system which uses an information code according to the fourth embodiment as well, the hardware configuration is identical to that according to the first embodiment. A configuration such as that shown in FIG. 1 and FIG. 2, described above, is used. An information code 400 (an information code composed of cells, which are units by which information is displayed, arranged within a predetermined code region) such as that shown in FIG. 27 and FIG. 28 is produced by a producing apparatus 2 such as that in FIG. 1.

The produced information code 400 can be read by a reader 10 such as that in FIG. 1 and FIG. 2. FIG. 27 conceptually shows an arrangement example of the specification pattern regions, the format region, the version region, the code word region, and the free space in the information code 400 produced in the system according to the fourth embodiment. FIG. 28 shows a specific example of the information code including an identification display portion similar to that in FIG. 27. In the information code 400 shown in FIG. 27, the specific cell arrangements in the region of the predetermined position 205, the region 107, and each code word region are omitted. However, in actuality, light cells and dark cells are arranged in these regions in a manner similar to that in FIG. 28.

The information code 400 shown in FIG. 27 is also provided with the specification pattern regions in which specification patterns (such as the position detecting patters 104 and the timing patterns 106) each having a shape determined in advance are arranged, the data recording region in which data is recorded by cells 102 of a plurality of types, and the error correction code recording region in which data is recorded by cells 102 of a plurality of types within the code region.

A free space 410 is provided in a position other than the specification pattern regions, the data recording region, and the error correction code recording region within the code region, such as to have a predetermined size that is larger than the size of a single cell 102. In the free space 410, at least either data recording or design display is possible by a method differing from the method for recording data in the data recording region. The free space 410 is configured as a region that is not subjected to error correction by the error correction codes. In the example in FIG. 27, the internal configuration of the free space 410 is omitted. However, various illustrations, characters, graphic forms, other symbols and the like can be displayed within the free space 410.

Here, a method for producing the information code 400 will be described.

In the present configuration as well, a plurality of versions are prepared for the type of the information code 400. The numbers of rows and columns of cells, the shapes and positions of the specification patterns, the position of the format data, and the arrangement candidate positions (addresses) of the code words are determined in advance for each version. When the producing apparatus 2 produces the information code 400, the version information is arranged in a predetermined position (a reserved region 107 in the example in FIG. 27) within the code region.

Meanwhile, the reader 10 has the above-described information (the numbers of rows and columns of cells, the shapes and positions of the specification patterns, the position of the format data, and the arrangement candidate positions (addresses) of the code words) for each version. Therefore, when the reader 10 reads the information code 400, the reader 10 analyzes the code image of the information code 10 and reads the version information arranged in the predetermined position. As a result, the reader 10 can ascertain the numbers of rows and columns of cells, the shapes and positions of the specification patterns, the position of the format data, and the arrangement candidate positions (addresses) of the code words of the information code 400.

When the information code 400 is produced, any version is selected from among the plurality of versions prepared in advance. As a result, the basic configuration (the positions of the position detecting patterns 104 serving as specification patterns, the numbers of rows and columns of cells, and the candidate positions of the code words) within the code region is determined. For example, in the version having the configuration shown in FIG. 27, the cell arrangement is composed of 29 rows and 29 columns. A specification pattern having the same structure as the clipping symbol of the QR code (registered trademark) (position detecting pattern 104) is arranged in three corner portions determined in advance. In a predetermined position near the position detecting pattern 104, a region in which the format information is recorded (predetermined position 105) is provided.

In addition, in the matrix region composed of 29 rows and 29 columns, the code word candidate positions are determined in advance in positions other than those of the position detecting patterns 104 and the predetermined position 105. An address from 0 to 67 is assigned to each candidate position. In this way, the configuration within the code region is prescribed in advance by the configuration corresponding to the version. Therefore, as long as the version is identified, the position in which a certain code word in the sequence is arranged can be identified. The information on the determined version is recorded in a fixed position determined in advance in the arrangement of the version. For example, in the example in FIG. 27, the version information is recorded in the region 107 identified by shading of a predetermined type.

When the version is determined and the basic configuration within the code region is determined, the shape and position of the free space 410 is determined. As the method for determining the shape of the free space 410, any method according to the above-described embodiments may be used. For example, in a manner similar to the first method (FIX MODE) according to the first embodiment, the shape may be determined by the method in which the shape is selected from among a plurality of shapes prepared in advance.

Alternatively, in a manner similar to the second method (USER MODE) according to the first embodiment, the shape may be determined by the method in which a shape is set that is based on shape designation information inputted to the information code producing apparatus 2 from outside. In addition, the position of the free space 410 may be determined to be a fixed position determined in advance. Alternatively, the position of the free space 410 may be determined by the user inputting information designating the position.

After the free space 410 is determined, the information code 400 is produced in a configuration which the code words in the data recording region and the code words in the error correction code recording region are each arranged in code word candidate positions outside of the determined position of the free space 410. For example, in the version configured as in FIG. 27, the position detecting patterns 104 are disposed in the three corner portions. With reference to the positions of the position detecting patterns 104, 68 code word candidate positions that are numbered from 0 to 67 are prescribed in advance. In such a layout, when the free space 410 is determined as in FIG. 27, code word candidate positions of which at least a portion falls within the free space 410 are excluded from the arrangement subject positions. The code words are arranged in sequence such as to skip the excluded code word positions. For example, in the example in FIG. 27, the free space 410 is set such as to fall within the 50th, 51st, 54th, and 60th to 67th code word candidate positions.

Therefore, the code words are not arranged in the 50th, 51st, 54th, and 60th to 67th code word candidate positions. In other words, after the code words are arranged in sequence in the 0th to 49th positions, the 50th and 51st positions are skipped. A code word is arranged in the 52nd position. Then, the 53rd and 54th positions are skipped. The code words are arranged in sequence in the 55th to 59th positions. As a result, the data code words that are the encoded data to be interpreted and the error correction code words indicating the error correction codes can be arranged with certainty in the candidate positions outside of the free space 410.

After the specification pattern regions (the regions of the position detecting patterns 104 and other specification patterns), the format region (the region of the predetermined position 105), the version region 107, each code word region, and the like are determined in this way, the specific content of the free space 410 is determined. In the present configuration, when the information code producing apparatus 2 produces the information code 400, the information code 400 is generated in a configuration in which a identification display portion having a display format differing from the display format of the cells in the data recording region is provided in the boundary portion and positions adjacent to the boundary portion of the free space 410. For example, in the examples in FIG. 27 and FIG. 28, a identification display portion 420 is configured by a contour line 420*a* having a predetermined line shape.

The contour line 420*a* is configured as a line of a predetermined color of which at least any of the hue, concentration, and luminance differs from the color of the cell 102. The line type is a publically known line type, such as a solid line, a dotted line, a single-dot chain line, a double-dot chain line, or the like. Various designs, information, and the like can be displayed within the boundary portion clarified by the contour line 420*a* in this way. For example, in the example in FIG. 28, a design of a cat is displayed within the boundary portion indicated by the contour line 420*a*.

The method of arranging the data code words and the error correction code words described above (see FIG. 27) can be similarly applied to other embodiments. For example, the code words can be arranged by a similar method in the first embodiment as well. In this case, the data code words are arranged in the code word candidate positions that remain after the position of the free space, determined by the method according to the first embodiment, has been eliminated from the plurality of code word candidate positions determined in advance, in sequence from the address having the lowest number. Then, the error correction code words are then merely arranged. According to the first embodiment, the position of the free space is recorded within the code as data. Therefore, as long as the position of the free space can be identified by the data, the positions of the code words can also be identified.

Next, reading of the information code 400 will be described.

When the information code reader 10 reads the information code 400 produced as described above, first, the reader 10 captures an image of the information code 400 by the light receiving sensor 23. In this example as well, the light receiving sensor 23 corresponds to an example of the imaging unit.

Then, the reader 10 extracts the code region from the captured image of the information code 400 that has been obtained, and interprets the data in the data recording region. The method for extracting the code region from the captured image of the information code 400 is similar to reading of a publically known QR code (registered trademark). After the regions of the three position detecting patterns 104 are identified, the outer edges of the code region for which the position detecting patterns 104 serve as the corner portions are identified. In addition, the timing pattern 106 is provided as a specification pattern. The numbers of rows and columns can be identified by the arrangement of the timing pattern 106. In addition, the version can be ascertained by reading the region 107 prescribed in advance. Through ascertaining the version, the candidate position of each code word can be identified. In addition, the format information can be ascertained by reading the region of the predetermined position 105.

After the specification pattern regions, the format region, and the version region, and the candidate position of each code word are identified in this way, the free space 410 is recognized. Specifically, the contour line 420*a* having the predetermined line shape is detected from the captured image of the information code 400 captured by the light receiving sensor 23 (imaging unit). For example, when the contour line 420*a* is configured by a predetermined color differing from the color of the cell 102, the contour line 420*a* can be detected by extracting the region of the predetermined color. The region within the contour line 420*a* that has been detected in this way is recognized as the free space 410.

In addition, a method may also be used in which, when the contour line 420*a* is a line that has a higher concentration than the light colored cells and a lower concentration than the dark colored cells, a region in which the luminance is greater than a predetermined first threshold (a threshold differentiating the luminance of the dark colored cells and the luminance of the contour line) and less than a predetermined second threshold (a threshold differentiating the luminance of the light colored cells and the luminance of the contour line) is detected.

After the free space 410 is detected in this way, among the candidate positions of the code words ascertained by reading of the format region, the candidate positions that remain after exclusion of the candidate positions that fall within the position of the free space 410 are identified. Each code word (the data code words and the error correction code words) arranged in the remaining candidate positions is interpreted in order from the smallest number. In this way, the data recorded in the data recording region can be interpreted and the position of the free space 410 can also be identified.

In the present configuration, the control circuit 40 corresponds to an example of a differentiated display detecting unit and a free space detecting unit. The control circuit 40 functions to detect the identification display portion 420 from the captured image of the information code 400 captured by the light receiving sensor 23 (imaging unit). Specifically, the control circuit 40 functions to detect the position of the free space 410 by detecting the contour line 420a having the predetermined line shape from the captured image of the information code 400.

In addition, the control circuit 40 corresponds to an example of a code word identifying section. The control circuit 40 functions to identify the positions of the code words in the data recording region and the code words in the error correction code recording region, based on the candidate positions of the plurality of code words prescribed in advance and the position of the free space detected by the free space detecting unit. Furthermore, the control circuit 40 corresponds to an example of the interpreting unit. The control circuit 40 functions to interpret the code words in the data recording region and the code words in the error correction code recording region identified by the code word identifying section, and interpret the data recorded in the data recording region based on the interpretation results.

[First Variation Example According to the Fourth Embodiment]

Next, a first variation example according to the fourth embodiment will be described.

The first variation example differs from the representative example according to the fourth embodiment merely in terms of the configuration of the identification display portion and the method for detecting the identification display portion. The first variation example is similar to the representative example in other aspects.

In the first variation example, the contour line 420a used in FIG. 27 and FIG. 28 is indicated by a special ink that is visible when light of a predetermined wavelength band differing from that of visible light is irradiated thereon, and invisible with visible light wavelength band differing from the predetermined wavelength band. The special ink may be, for example, a publically known ultraviolet light emitting ink, infrared light emitting ink, or the like.

When the contour line 420a is indicated by a special ink in this way, an irradiating unit that irradiates light of the predetermined wavelength band may be provided as any one of the illumination light sources 21 in the information code reader 10, or as a light source other than the illumination light source 21. For example, when the special ink is the ultraviolet light emitting ink, the irradiating unit may be configured to emit ultraviolet light. When the special ink is the infrared light emitting ink, the irradiating unit may be configured to emit infrared light.

In this example, when an image of the information code 400 is captured by the light receiving sensor 23 in a state in which the irradiating unit is irradiating light of the predetermined wavelength band thereon, an image of the information code 400 in a state in which the contour line 420a is emitting light and is visible is obtained. The control circuit 40 that corresponds to the differentiated display detecting unit can then detect the region of the special ink (the region of the contour line 420a) in the captured image of the information code in a state irradiated with the light of the predetermined wavelength band by the irradiating unit, thereby identifying the outer edge portion of the free space 410. In this case as well, the region of the contour line 420a may be detected by a method similar to that in the representative example described above.

[Second Variation Example According to the Fourth Embodiment]

Next, a second variation example according to the fourth embodiment will be described.

The second variation example differs from the representative example according to the fourth embodiment merely in terms of the configuration of the identification display portion and the method for detecting the identification display portion. The second variation example is similar to the representative example in other aspects.

In the representative example and the first variation example, an example is given in which the identification display portion is configured by a contour line. However, the identification display portion may be configured by other-type cells that differ in at least any of hue, concentration, luminance, and shape from the cells 102 arranged in the data recording region.

In the example in FIG. 29 of the second variation example, low-concentration cells 422a of which the concentration differs from that of the cells 102 are arranged in at least positions adjacent to the boundary of the free space 410 within the free space 410. Of the two types of cells 102 (light colored cells and dark colored cells) composing the data recording region, the low-concentration cells 422a have a lower concentration than the dark colored cells and a higher concentration than the light colored cells. In the example in FIG. 29, the light colored cells are composed of white cells. The dark colored cells are composed of black cells. The low-concentration cells 422a are, for example, composed of gray cells.

When the identification display portion 422 is indicated by the low-concentration cells 422a in this way as well, an image of the information code 400 is captured in a manner similar to that in the representative example. By a method similar to that in the representative example, the specification pattern regions, the format region, the version region, and the candidate position of each code word are identified. The position of the free space 410 is identified through recognition of the low-concentration cells 422a. Specifically, the concentration at each cell position is detected in the captured image of the information code 400 captured by the light receiving sensor 23 (imaging unit).

For example, after identifying the center position of each cell arranged in a plurality of rows and a plurality of columns, the concentration at each center position is detected. The cell position at which the concentration at the center position is greater than a predetermined threshold A1 (a threshold differentiating the light colored cell and the low-concentration cell 422a) and less than a predetermined threshold A2 (a threshold differentiating the dark colored cell and the low-concentration cell 422a) is detected as the position of the low-concentration cell 422a. The cells of which the concentration at the center positions is the threshold A1 or less may be determined to be white cells (light colored cells). The cells of which the concentration at the center positions is the threshold A2 or greater may be determined to be black cells. After the regions of the plurality of low-concentration cells 422a are detected in this way, the boundary portion of the region in which the plurality of low-concentration cells 422a are concentrated is considered the boundary of the free space 410, and the area within the boundary is recognized as the free space 410.

In the present configuration, the control circuit 40 corresponds to a differentiated display detecting unit. The control circuit 40 functions to detect other-type cells (low-concentration cells 422*a*) from the captured image of the information code 400 captured by the light receiving sensor 23 (imaging unit).

In the example described above, the low-concentration cells 422*a* are arranged in at least the boundary portion within the free space. However, the low-concentration cells 422*a* may not be arranged within the free space. Dark cells arranged adjacent to the free space outside of the free space may be set as the low-concentration cells 422*a*. In this case, the low-concentration cells 422*a* are not included within the free space, and the region to the inner side of the low-concentration cells 422*a* is the free space.

[Third Variation Example According to the Fourth Embodiment]

Next, at third variation example according to the fourth embodiment will be described.

The third variation example differs from the representative example according to the fourth embodiment merely in terms of the configuration of the identification display portion and the method for detecting the identification display portion. The third variation example is similar to the above-described representative example in other aspects.

In the third variation example, the identification display portion is configured by other-type cells that have a predetermined shape differing from the shape of the cells 102 arranged in the data recording region. In the example in FIG. 30, other-shape cells 423*a* having a predetermined shape differing from the shape of the ordinary cells 102 (a shape that is a quadrangle solidly colored with a light color or a dark color) are arranged in positions adjacent to the boundary of the free space 410 within the free space 410. The other-shape cell 423*a* is a cell in which a circular graphic form is drawn within the cell region, and a white circle is drawn within a black quadrangle or a black circle is drawn within a white quadrangle.

When the identification display portion 423 is indicated by the other-shape cells 423*a* in this way as well, in a manner similar to that in the representative example, an image of the information code 400 is captured, and the specification pattern regions, the format region, the version region, and the candidate position of each code word are identified. Then, the position of the free space 410 is identified through recognition of the other-shape cells 423*a*. Specifically, the regions of a specific cell shape (the shape of the other-shape cell 423*a*) are detected in the captured image of the information code 400 captured by the imaging unit. After the regions of the plurality of other-shaped cells 423*a* are detected in this way, the regions of the plurality of other-shaped cells 423*a* are considered to be the boundary portion of the free space 410, and the region therewithin is recognized as the free space 410.

In the present configuration, the control circuit 40 corresponds to the differentiated display detecting unit. The control circuit 40 functions to detect the other-type cells (other-shape cells 423*a*) from the captured image of the information code 400 captured by the light receiving sensor 23 (imaging unit).

In the example described above, the other-shaped cells 423*a* are arranged in the boundary portion within the free space. However, the other-shaped cells 423*a* may not be arranged within the free space. The dark colored cells, the light colored cells, or both cells arranged adjacent to the free space outside of the free space may be considered the other-shape cells 423*a*. In this case, the other-shape cells 423*a* do not fall within the free space, and the region to the inner side of the other-shape cells 423*a* is understood to be the free space.

[Fourth Variation Example According to the Fourth Embodiment]

Next, a fourth variation example according to the fourth embodiment will be described.

The fourth variation example differs from the representative example according to the fourth embodiment merely in terms of the configuration of the identification display portion and the method for detecting the identification display portion. The fourth variation example is similar to the above-described representative example in other aspects.

In the present variation example, the identification display portion is configured by a plurality of symbols. In the example in FIG. 31, a symbol region 424*a* in which the character "A" is indicated is arranged in the positions adjacent to the boundary of the free space 410 within the free space 410. The symbol region 424*a* is configured by the character A being indicated within a quadrangular frame.

When the identification display portion 424 is indicated by the symbol region 424*a* in this way as well, during reading, in a manner similar to that in the representative example, an image of the information code 400 is captured, and the specification pattern regions, the format region, the version region, and the candidate position of each code word are identified. Then, the position of the free space 410 is identified through recognition of the symbol region 424*a*. Specifically, a specific character (the character "A") is detected in the captured image of the information code 400 captured by the light receiving sensor 23 (imaging unit). A publically known character recognition technology (OCR technology) may be used for the detection of the character. Then, after the symbol region 424*a* in which the specific character A is indicated in this way is detected, the plurality of symbol regions 424*a* are considered the boundary portion of the free space 410, and the region therewithin is recognized as the free space 410.

In the present configuration, the control circuit 40 corresponds to the differentiated display detecting unit. The control circuit 40 functions to detect the plurality of symbols from the captured image of the information code 400 captured by the light receiving sensor 23 (imaging unit).

[Fifth Variation Example According to the Fourth Embodiment]

Next, a fifth variation example according to the fourth embodiment will be described.

The fifth variation example differs from the representative example according to the fourth embodiment merely in terms of the configuration of the identification display portion and the method for detecting the identification display portion. The fifth variation example is similar to the above-described representative example in other aspects.

In the present variation example as well, the identification display portion is configured by a plurality of symbols. Specifically, as shown in FIG. 32, numeric character regions 425*a* in which numbers are indicated are arranged in the positions adjacent to the boundary of the free space 410 within the free space 410. The numeric character region 425*a* is configured such that any number from 0 to 9 is indicated within a quadrangular frame.

When the identification display portion 424 is indicated by the numeric character regions 425*a* in this way as well, during reading, in a manner similar to that in the representative example, an image of the information code 400 is captured, and the specification pattern regions, the format region, the version region, and the candidate position of each code word are identified. Then, the position of the free space 410 is identified through recognition of the numeric character regions 425*a*. Specifically, numbers are detected in the captured image of the information code 400 captured by the light receiving sensor 23 (imaging unit).

A publically known character recognition technology (OCR technology) may be used for the detection of the numbers. Then, after the numeric character regions in which the numbers are indicated in this way are detected, the numeric character regions 425a are considered the boundary portion of the free space 410, and the region therewithin is recognized as the free space 410. In the example in FIG. 32, the numbers are sequentially arranged in the boundary portion of the free space 410. A ring-shaped boundary portion can be recognized by adjacent numbers being followed in sequence, i.e., 0, 1, 2, 3, 4, 5, 6, 7, 8, 9, 0, 1, 2, . . . .

In the present configuration, the control circuit 40 corresponds to the differentiated display detecting unit. The control circuit 40 functions to detect a plurality of symbols from the captured image of the information code 400 captured by the light receiving sensor 23 (imaging unit).

[Sixth Variation Example According to the Fourth Embodiment]

Next, a sixth variation example according to the fourth embodiment will be described.

The sixth variation example differs from the representative example according to the fourth embodiment merely in terms of the configuration of the identification display portion and the method for detecting the identification display portion. The sixth variation example is similar to the above-described representative example in other aspects.

In the present variation example, a identification display portion 426 is configured by other-shape cells that have a shape differing from that of the cells 102 arranged in the data recording region In the example in FIG. 33, the other-shape cells 426a having a shape differing from that of the cells 102 are arranged in positions adjacent to the boundary of the free space 410 within the free space 410. The other-shape cell 426a is configured such that one side of the outer edge portion of the black cell of the cells 102 is deformed into a predetermined shape (a recessing/protruding shape).

When the identification display portion 426 is indicated by the other-shape cells 426a in this way as well, in a manner similar to that in the representative example, an image of the information code 400 is captured, and the specification pattern regions, the format region, the version region, and the candidate position of each code word are identified.

Then, the position of the free space 410 is identified through recognition of the other-shape cells 426a. Specifically, the regions of a specific cell shape (the shape of the other-shape cell 426a) are detected in the captured image of the information code 400 captured by the imaging unit. After the regions of the plurality of other-shaped cells 426a are detected in this way, the regions of the plurality of other-shaped cells 426a are considered to be the boundary portion of the free space 410, and the region therewithin is recognized as the free space 410.

In the present configuration, the control circuit 40 corresponds to the differentiated display detecting unit. The control circuit 40 functions to detect the other-type cells (other-shape cells 426a) from the captured image of the information code 400 captured by the light receiving sensor 23 (imaging unit).

In the sixth variation example, an example is given of a configuration in which the other-shape cells 426a are arranged in the boundary portion of the free space 410. However, cells adjacent to the free space 410, among the dark colored cells configuring the data recording region and the error correction code recording region, may be configured to be the other-shaped cells 426a. In this case, a region that does not include the other-shape cells 426a and is to the inner side of the other-shape cells 426a is recognized as the free space 410.

In addition, the above-described other-shape cells 426a may hold information. For example, as in FIG. 34, the recessing/protruding pattern of the other-shape cells 426a may be defined such as to express information. Only other-shape cells 426a that express predetermined information may be recognized as the boundary portion. In the example in FIG. 34, the upper edge portion of a dark colored cell is divided into eight regions. Information is expressed such that a recessed region is 0 and a protruding region is 1.

[Fifth Embodiment]

Next, a fifth embodiment will be described.

The information code produced according to the fifth embodiment includes all of the features of the information code generated according to the second embodiment. Furthermore, the information code is configured to be provided with a identification display portion in the boundary portion of the free space in a manner similar to that according to the fourth embodiment.

In the example in FIG. 36, only the position of the free space and the content of the free space differ from that in FIG. 24. The information code is similar to that in FIG. 24 in other aspects. The position of the free space may be the same as that in FIG. 24.

In the present configuration as well, the information code 200 can be produced by the same information code producing apparatus 2 as that according to the first embodiment. The information code 200 is also provided with the specification pattern regions (regions for the position detecting patterns 204, the timing pattern, the alignment pattern, and the like), the data recording region in which data to be interpreted is recorded by cells of a plurality of types, and the error correction code recording region in which error codes are recorded by cells of a plurality of types. The free space 210 is configured as a region to be error-corrected by the error correction codes. In other words, the information code 200 is configured as a publically known QR code (registered trademark). Data error caused by the drawing in the free space 210 can be corrected by the error correction codes recorded in the error correction code recording region.

In this example, when the information code producing apparatus 2 produces the information code 200, after the QR code (registered trademark) is produced using a publically known method, the free space 210 is provided in a predetermined position such as to be configured to overwrite a portion of the QR code (registered trademark). The information code 200 is produced with a configuration in which the identification display portion having a display format differing from the display format of the cells in the data recording region is provided in the boundary portion of the free space 210 or in positions adjacent to the boundary portion.

In the example in FIG. 36, the identification display portion 220 is configured by a contour line 220a having a predetermined line shape. The contour line 220a has features similar to those in the representative example according to the fourth embodiment. For example, the contour line 220a is configured as a line of a predetermined color differing from that of the cells. The line type is a publically known line such as a solid line, a dotted line, a single-dot chain line, a double-dot chain line, or the like. Various designs, information, and the like can be displayed within the boundary portion clarified by the contour line 220a in this way. In FIG.

36, the drawn content within the free space 210 is omitted. Specific cell contents of the regions of the code word regions A0 to A25 and the fixed region (shaded region) in which format information and the like are recorded are also omitted.

According to the present embodiment, the information code is read by a process such as that in FIG. 35. In this example, first, the reader 10 captures an image of the information code and detects the contour shape of the information code (S41). Then, the reader 10 reads the format information arranged in a predetermined position and identifies the code type (such as the version) of the captured information code, and the like (S42). The reading process in FIG. 35 is a process presuming, for example, reading of a publically known QR code. Recognition of the contour shape and reading of the format information can be performed using a publically known reading method for standardized QR codes.

After the contour shape and code type of the captured information code are identified in this way, the reader 10 detects the boundary information of the free space. The detection method is similar to that in the representative example according to the fourth embodiment. The reader 10 detects the contour line having a predetermined line shape from the captured image of the information code captured by the light receiving sensor 23 (imaging unit). For example, when the information code 200 such as that in FIG. 36 is captured, the contour line 220a is composed of a predetermined color differing from the color of the cells.

Therefore, the contour line 220a can be detected by the region of the predetermined color being extracted. When determined that the boundary information is present (in other words, when the contour line 220a is detected), the reader 10 proceeds to Yes at S44. The reader 10 recognizes the region within the contour line 220a detected in this way as the free space 210 (S45). Meanwhile, when determined that the boundary information is not present (in other words, when the contour line 220a is not detected), the reader 10 proceeds to No at S44.

After proceeding to Yes at S44 and recognizing the free space 210 at S45, the reader 10 subsequently performs a mapping process. The reader 10 identifies each cell position using a publically known cell position identification method used for QR codes and determines the lightness/darkness at each cell position (S46). The reader 10 reads the recorded content of each code word (data code words and error correction code words) based on such lightness/darkness determination results. Then, the reader 10 interprets the content of the data code words. When interpreting the data code words, the reader 10 performs elimination correction with the position of the code word present in the free space 210 detected at S45 as an error position (S47). The method for performing error correction using the error correction code is publically known.

When the error correction is performed, correction (elimination correction) in a state in which the error position is already known is also publically known. Therefore, correction may be performed using a publically known elimination correction method. Meanwhile, when proceeding to No at S44, the reader 10 performs reading that is similar to normal QR code reading. In this case as well, the reader 10 performs the mapping process. The reader 10 then identifies each cell position using a publically known cell position identification method used for QR codes and determines the lightness/darkness at each cell position (S48). The reader 10 reads the recorded content of each code word (data code words and error correction code words) based on such lightness/darkness determination results. In the interpretation at S49, the error position cannot be identified. Therefore, typical error correction is performed with the error position unknown.

In the present configuration, the control circuit 40 (FIG. 2) corresponds to an example of the interpreting unit. When an image of the information code 200 is captured by the light receiving sensor 23 (imaging unit), the control circuit 40 functions to perform error correction based on the error correction codes recorded in the error correction code recording region and interpret the data recorded in the data recording region.

In addition, the control circuit 40 corresponds to the free space detecting unit. The control circuit 40 functions to detect the position of the free space 210. Furthermore, the control circuit 40 functions to perform elimination correction with the position of the free space 210 as the error position, based on the position of the free space 210 detected by the free space detecting unit and the error correction codes recorded in the error correction code recording region, and interprets the data recorded in the data recording region.

In a configuration such as this, elimination correction can be performed with the position of the free space as an already known error position. Therefore, correction efficiency can be increased compared to error correction when the error position is unknown. For example, when elimination correction such as this is premised, the region in which error correction can be performed is more easily widened. A larger free space can be more easily secured. The free space can be more easily configured with a higher degree of freedom.

In the above-described representative example according to the fifth embodiment, an example is given in which the identification display portion 220 is the contour line 220a having the predetermined line shape. However, the identification display portion 220 may have the configurations in the variation examples according to the fourth embodiment. In this case, the differentiated display position may be detected by a method similar to the method described for each variation example.

[Other Embodiments]

The present invention is not limited to the embodiments that are described above and in the drawings. For example, the following embodiments are also encompassed in the technical scope of the present invention.

The present invention can also be configured as a display apparatus that is capable of displaying any one of, a plurality of, or all of information codes described above. In addition, the present invention can also be configured as a printing apparatus that is capable of printing any one of, a plurality of, or all of information codes described above. Furthermore, the present invention can be configured as a computer-readable program for producing any one of, a plurality of, or all of information codes described above. In addition, the present invention can also be configured as a recording medium in which is recorded a program for producing any one of, a plurality of, or all of information codes described above.

Furthermore, the present information can be understood to be an information code medium (an article configured by printed matter, direct marking, or the like) to which is attached any one of, a plurality of, or all of information codes described above. In addition, the present invention can be understood to be a display image displaying any one of, a plurality of, or all of information codes described above.

In the configuration in FIG. 1 and the like, an example is shown in which the information code producing apparatus 2 and the information code reader 10 are configured to be separate apparatuses. However, the information code producing apparatus 2 may also be configured as the information code reader 10.

According to the above-described embodiments, an example is given in which the free space 110 is provided in the center portion of the code region. However, the arrangement of the free space 110 is not limited to this example. For example, in FIG. 1 and the like, a configuration is shown in which a graphical form is attached to the free space. However, various other designs may be used as long as the configuration is composed of a graphical form, a pattern, a color, or a combination thereof.

In addition, when information is displayed instead of or in addition the design, the content of the information varies. For example, the information may be the name of the provider (business owner, individual, or the like) providing the data recorded in the information code 110, the website address of the provider entity, or the like, The information may also be a product name, a position name, or the like related to the data recorded in the information code 100.

According to the above-described embodiments, the QR code is given as an example of the other type of code. The specification patterns of the QR code are given as the examples of the specification patterns used in the information code 100. However, a two-dimensional code of a type other than the QR code may also be used. For example, a data matrix code may be used as the other type of code. The specification patterns of the data matrix code may be used as the specification patterns of the information code 100.

The correspondence in the arrangement conversion table set as in FIG. 5 can be arbitrarily changed as in FIG. 26. For example, when the arrangement conversion table set as in FIG. 5 in the information code producing apparatus 2 and the information code reader 10 is changed to that in FIG. 26, in the produced information code 100, the arrangement of the 22nd to 26th code words is changed from that in the right-hand diagram in FIG. 5 (arranged to be recorded in the 22nd to 26th arrangement candidate positions) to that in the right-hand diagram in FIG. 26 (arranged to be recorded in the 42nd to 46th arrangement candidate positions). As a result, the position and shape of the free space 110 is also changed. In other words, in this configuration, the position and shape of the free space 110 can be adjusted by the arrangement conversion table being adjusted. The degree of freedom when configuring the free space can be further increased.

According to the above-described embodiments, an example is given in which the setting method for the free space is selected between two modes. However, the present invention is not limited to this example. For example, a mode other than the above-described two modes may be added, such as a mode in which a unique pattern corresponding to an arbitrary user-defined shape is used.

REFERENCE SIGNS LIST

1 system which uses an information code
2: information code producing apparatus
10: information code reader
23: light receiving sensor (imaging unit)
40: control circuit (interpreting unit, free space detecting unit, code word identifying section, identification display portion)
100, 200, 300, 400: information code
102, 202, 302: cell
104, 204: position detecting pattern (specification pattern)
106: timing pattern (specification pattern)
108: alignment pattern (specification pattern)
304*a*: alignment pattern (specification pattern)
304*b*: timing cell (specification pattern)
110, 210, 310, 410: free space
120: QR code serving as another type of code
420, 422, 423, 424, 425, 426: differentiated display unit
420*a*: contour line
422*a*: low-concentration cell (other-type cell)
423*a*, 426*a*: other-shape cell (other-type cell)
424*a*: symbol region
425*a*: numeric character region
R: object to be read (medium)
REG: code region

The invention claimed is:

1. An information code producing method for producing information code by an information code producing apparatus, the information code having a predetermined code region of a medium in which cells are arranged, the cells being units for displaying information, the information code producing method comprising:
   providing a specification pattern region and a data recording region in the code region, a specification pattern being arranged in the specification pattern region, data being recorded in the data recording region by a plurality of types of the cells, the specification pattern having a predetermined shape and including a pattern indicating a position of the code region;
   providing a free space in a position other than the specification pattern region in the code region, the free space enabling at least one of recoding data and displaying designs differently from and independently of a method for recording data in the data recording region, the free space having a predetermined size larger than a size of a single cell of the cells; and
   determining a shape of the free space by at least one of: a method for selecting a shape from a plurality of preliminarily prepared candidate shapes; and a method for setting a shape according to shape specifying information input from outside to the information code producing apparatus.

2. The information code producing method according to claim 1, further comprising:
   providing the specification pattern region, the data recording region, and an error correction code recording region in the code region, error correction codes being recorded in the error correction code recording region by a plurality of types of the cells; and
   providing the free space in a position other than: the specification pattern region; the data recording region; and the error correction code recording region in the code region, as a region that does not become an object region to which error correction is applied by the error correction codes.

3. The information code producing method according to claim 2, further comprising:
   respectively arranging a code word of the data recording region and a code word of the error correction code recording region in a position of the specification pattern region and a candidate position in the code region, the candidate position deviating from a determined position of the free space in predetermined candidate positions of a plurality of code words.

4. The information code producing method according to claim 1, further comprising:
   providing the specification pattern region, the data recording region, and an error correction code recording region in the code region, error correction codes being recorded in the error correction code recording region by a plurality of types of the cells; and configuring the free space as an object region to which error correction is applied by the error correction codes.

5. The information code producing method according to claim 1, further comprising:

recording format information in a predetermined fixed region in the code region; and providing the free space in a position other than the fixed region in the code region.

6. The information code producing method according to claim 5, further comprising:

determining a shape of the free space by one of: a first method for selecting a shape from the plurality of candidate shapes; and a second method for setting a shape according to the shape specifying information input from outside to the information code producing apparatus; and recording, in the fixed region, information specifying a method used for determining a shape of the free space, as the format information.

7. An information code having a predetermined code region of a medium in which cells are arranged, the cells being units for displaying information, the information code comprising:

a specification pattern region and a data recording region that are disposed in the code region, a specification pattern being arranged in the specification pattern region, data being recorded in the data recording region by a plurality of types of the cells, the specification pattern having a predetermined shape and including a pattern indicating a position of the code region; and a free space that is disposed in a position other than the specification pattern region in the code region, the free space enabling at least one of recoding data and displaying designs differently from and independently of a method for recording data in the data recording region, the free space having a predetermined size larger than a size of a single cell of the cells, the free space having a shape that is determined by at least one of: a method for selecting a shape from a plurality of preliminarily prepared candidate shapes; and a method for setting a shape according to shape specifying information input from outside to the information code producing apparatus.

8. The information code according to claim 7, wherein:

the specification pattern region, the data recording region, and an error correction code recording region are disposed in the code region, error correction codes being recorded in the error correction code recording region by a plurality of types of the cells; and the free space is disposed in a position other than: the specification pattern region; the data recording region; and the error correction code recording region in the code region, as a region that does not become an object region to which error correction is applied by the error correction codes.

9. The information code according to claim 8, wherein a code word of the data recording region and a code word of the error correction code recording region are respectively arranged in a position of the specification pattern region and a candidate position in the code region, the candidate position deviating from a determined position of the free space in predetermined candidate positions of a plurality of code words.

10. The information code according to claim 7, wherein:

the specification pattern region, the data recording region, and an error correction code recording region are disposed in the code region, error correction codes being recorded in the error correction code recording region by a plurality of types of the cells; and the free space is configured as an object region to which error correction is applied by the error correction codes.

11. The information code according to claim 7, wherein:

format information is recorded in a predetermined fixed region in the code region; and the free space is disposed in a position other than the fixed region in the code region.

12. The information code according to claim 11, wherein the free space has a shape that is determined by one of: a first method for selecting a shape from the plurality of candidate shapes; and a second method for setting a shape according to the shape specifying information; and information specifying a method used for determining a shape of the free space is recorded as the format information in the fixed region.

13. An information code reader that reads an information code having a predetermined code region of a medium in which cells are arranged, the cells being units for displaying information, the information code comprising:

a specification pattern region and a data recording region that are disposed in the code region, a specification pattern being arranged in the specification pattern region, data being recorded in the data recording region by a plurality of types of the cells, the specification pattern having a predetermined shape and including a pattern indicating a position of the code region; and a free space that is disposed in a position other than the specification pattern region in the code region, the free space enabling at least one of recoding data and displaying designs differently from and independently of a method for recording data in the data recording region, the free space having a predetermined size larger than a size of a single cell of the cells, the free space having a shape that is determined by at least one of: a method for selecting a shape from a plurality of preliminarily prepared candidate shapes; and a method for setting a shape according to shape specifying information input from outside to the information code producing apparatus; and the information code reader comprising:

an imaging unit capable of imaging the information code; and an interpreting section that interprets data recorded in the data recording region when the information code is imaged by the imaging unit.

14. The information code reader according to claim 13, wherein the information code is configured such that:

the specification pattern region, the data recording region, and an error correction code recording region are disposed in the code region, error correction codes being recorded in the error correction code recording region by a plurality of types of the cells; and the free space is disposed in a position other than: the specification pattern region; the data recording region; and the error correction code recording region in the code region, as a region that does not become an object region to which error correction is applied by the error correction codes.

15. The information code reader according to claim 14, wherein:
the information code is configured such that a code word of the data recording region and a code word of the error correction code recording region are respectively arranged in a position of the specification pattern region and a candidate position in the code region, the candidate position deviating from a determined position of the free space in predetermined candidate positions of a plurality of code words;
the interpreting section comprises:
a free space detecting section that detects a position of the free space; and
a code word determining section that determines the code word of the data recording region and a position of the code word of the error correction code recording region, based on the predetermined candidate positions of the plurality of code words and the position of the free space detected by the free space detecting section; and
the interpreting section interprets the code word of the data recording region and the code word of the error correction code recording region determined by the code word determining section.

16. The information code reader according to claim 13, wherein:
the information code is configured such that:
the specification pattern region, the data recording region, and an error correction code recording region are disposed in the code region, error correction codes being recorded in the error correction code recording region by a plurality of types of the cells; and
the free space is configured as an object region to which error correction is applied by the error correction codes; and
the interpreting section performs error correction based on the error correction codes recorded in the error correction code recording region, when the information code is imaged by the imaging unit, and interprets data recorded in the data recording region.

17. The information code reader according to claim 16, wherein
the interpreting section comprises a free space detecting section that detects a position of the free space, performs correct disappearance on a condition that a position of the free space is regarded as an error position, based on the position of the free space detected by the free space detecting section and the error correction codes recorded in the error correction code recording region, and interprets data recorded in the data recording region.

18. The information code reader according to claim 13, wherein:
the information code is configured such that:
format information is recorded in a predetermined fixed region in the code region; and
the free space is disposed in a position other than the fixed region in the code region; and
the interpreting section determines an arrangement of the data recording region based on the format information recorded in the fixed region in the code region, and interprets data recorded in the data recording region.

19. The information code reader according to claim 18, wherein:
the information code is configured such that:
the free space has a shape which is determined by one of: a first method for selecting a shape from the plurality of candidate shapes; and a second method for setting a shape according to the shape specifying information; and
information specifying a method used for determining a shape of the free space is recorded as the format information in the fixed region; and
the interpreting section determines one of the first method and the second method by which the shape of the free space has been determined, based on the format information recorded in the fixed region.

20. A system which uses an information code, the system comprising:
an information code producing apparatus that produces an information code having a predetermined code region of a medium in which cells are arranged, the cells being units for displaying information; and
an information code reader that reads the information code produced by the information code producing apparatus,
the information code producing apparatus producing the information code which is configured such that:
a specification pattern region and a data recording region are disposed in the code region, a specification pattern being arranged in the specification pattern region, data being recorded in the data recording region by a plurality of types of the cells, the specification pattern having a predetermined shape and including a pattern indicating a position of the code region; and
a free space is disposed in a position other than the specification pattern region in the code region, the free space enabling at least one of recoding data and displaying designs differently from and independently of a method for recording data in the data recording region, the free space having a predetermined size larger than a size of a single cell of the cells,
the free space having a shape that is determined by at least one of: a method for selecting a shape from a plurality of preliminarily prepared candidate shapes; and a method for setting a shape according to shape specifying information input from outside to the information code producing apparatus; and
the information code reader comprising:
an imaging unit capable of imaging the information code; and
an interpreting section that interprets data recorded in the data recording region when the information code is imaged by the imaging unit.

* * * * *